(12) United States Patent
Wang et al.

(10) Patent No.: US 11,457,231 B2
(45) Date of Patent: Sep. 27, 2022

(54) METHODS AND APPARATUS FOR SIGNALING SPATIAL RELATIONSHIPS FOR POINT CLOUD MULTIMEDIA DATA TRACKS

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/815,888

(22) Filed: Mar. 11, 2020

(65) Prior Publication Data

US 2020/0296397 A1  Sep. 17, 2020

Related U.S. Application Data

(60) Provisional application No. 62/818,785, filed on Mar. 15, 2019.

(51) Int. Cl.
*H04N 19/44* (2014.01)
*H04N 13/161* (2018.01)
*H04N 13/178* (2018.01)

(52) U.S. Cl.
CPC .......... *H04N 19/44* (2014.11); *H04N 13/161* (2018.05); *H04N 13/178* (2018.05)

(58) Field of Classification Search
CPC .... H04N 19/44; H04N 13/161; H04N 13/178; H04N 19/597; H04N 19/30; H04N 19/172; H04N 19/119; H06F 9/50; H06K 9/00; G06N 3/04; G06N 3/063; H04L 65/601;
(Continued)

(56) References Cited

U.S. PATENT DOCUMENTS 9,002,991 B2 * 4/2015 Fletcher ............. H04N 21/2625
709/219
2010/0189424 A1   7/2010 Doehla et al.
2012/0023250 A1   1/2012 Chen et al.
(Continued)

OTHER PUBLICATIONS

S. Jang et al., "Description of PCC Core Experiment 2.19 on V-PCC tiles"; MPEG2019/N18188, Marrakesh, Morocco, Jan. 2019 (Year: 2019).*

(Continued)

*Primary Examiner* — Dramos Kalapodas
(74) *Attorney, Agent, or Firm* — Wolf, Greenfield & Sacks, P.C.

(57) ABSTRACT

The techniques described herein relate to methods, apparatus, and computer readable media configured to encode and/or decode video data. Point cloud video data includes a plurality of tracks. first metadata of a first track of the plurality of tracks, the first metadata specifying a first source region of a plurality of source regions of the point cloud video data, wherein each source region corresponds to a different spatial portion of the point cloud video data. The first metadata specifies a sub-region of the first track in the first source region comprising data indicative of a spatial position of video data of the first track in the first source region. Point cloud media is generated, based on the first metadata, for the sub-region of the first source region using the video data of the first track.

22 Claims, 16 Drawing Sheets

(58) Field of Classification Search
CPC ......... G06T 15/005; G06T 9/00; G06T 9/001; G06T 17/20
See application file for complete search history.

(56) References Cited

U.S. PATENT DOCUMENTS

| | | |
|---|---|---|
| 2016/0232939 A1 | 8/2016 | Malamal Vadakital et al. |
| 2016/0342596 A1 | 11/2016 | Aksu et al. |
| 2017/0237965 A1 | 8/2017 | Wang et al. |
| 2017/0347100 A1 | 11/2017 | Chou et al. |
| 2018/0268570 A1* | 9/2018 | Budagavi ................ G06T 9/001 |
| 2019/0052937 A1 | 2/2019 | Malamal Vadakital et al. |
| 2019/0139266 A1* | 5/2019 | Budagavi ................ G06T 17/00 |
| 2020/0099997 A1 | 3/2020 | Denoual et al. |
| 2020/0107008 A1 | 4/2020 | Hur et al. |
| 2020/0112709 A1* | 4/2020 | Lim ..................... H04N 13/161 |
| 2020/0120326 A1 | 4/2020 | Deshpande |
| 2020/0153884 A1* | 5/2020 | Hernandez ........ H04L 29/06027 |
| 2020/0153885 A1* | 5/2020 | Lee ......................... G06T 9/001 |
| 2020/0250003 A1* | 8/2020 | Yang ..................... G06F 21/53 |
| 2020/0250891 A1* | 8/2020 | Curcio ............... H04N 21/8586 |
| 2020/0260063 A1 | 8/2020 | Hannuksela |
| 2020/0294271 A1* | 9/2020 | Ilola .......................... G06T 9/00 |
| 2020/0296350 A1* | 9/2020 | Oh ....................... H04N 13/161 |
| 2020/0296394 A1* | 9/2020 | Choi ..................... H04N 19/70 |
| 2020/0304834 A1 | 9/2020 | Wang et al. |
| 2020/0344493 A1* | 10/2020 | Fleureau .............. H04N 13/268 |
| 2021/0112233 A1 | 4/2021 | Hannuksela |
| 2021/0152808 A1* | 5/2021 | He ......................... H04N 21/84 |
| 2021/0176509 A1* | 6/2021 | Maze ............. H04N 21/234327 |
| 2021/0194946 A1* | 6/2021 | Hannuksela ..... H04N 21/85406 |
| 2021/0195162 A1* | 6/2021 | Chupeau .......... H04N 21/21805 |

OTHER PUBLICATIONS

S. Jang et al., "Description of PCC Core Experiment 2.19 on V-PCC tiles"; MPEG2019/N18188, Marrakesh, Morocco, Jan. 2019 (Year: 2019) (Year: 2019).*

[No Author Listed], Information technology—Coded representation of immersive media—Part 10: Carriage of Point Cloud Data. ISO/IEC JTC1/SC29/WG11. ISO 23090-10:2019(E):13 pages.

[No Author Listed], Information technology—Coding of audio-visual objects—Part 12: ISO base media file format. ISO/IEC 14496-12, Fifth Edition. Feb. 20, 2015: 286 pages.

Jang et al., Description of PCC Core Experiment 2.19 on V-PCC tiles. International Organisation for Standardisation, Coding of Moving Pictures and Audio, ISO/IEC JTC1/SC29/WG11, MPEG2019/N18188. Jan. 2019:12pages.

Mammou et al., Study Text of ISO/IEC CD 23090-5: Video-based Point Cloud Compression. International Organisation for Standardisation, Coding of Moving Pictures and Audio, ISO/IEC JTC1/SC29/WG11, N18180. Jan. 2019:102 pages.

Schwarz et al., Emerging MPEG standards for point cloud compression. IEEE Journal on Emerging and Selected Topics in Circuits and Systems. Mar. 2019; 9(1):133-48.

Singer et al., Technologies under Consideration for ISOBMFF. International Organisation for Standardisation, Coding of Moving Pictures and Audio, ISO/IEC JTC1/SC29/WG11, MPEG2018/N18240. Jan. 2019:62 pages.

Wang et al., Media Processing related Track Derivations in ISOBMFF. International Organisation for Standardisation, Coding of Moving Pictures and Audio, ISO/IEC JTC1/SC29/WG11, MPEG2016/M44800. Oct. 2018: 17 pages.

Wang et al., Signaling of 2D and 3D Spatial Relationship and Sample groups for V-PCC Visual (Sub-Picture and Sub-Volumetric) Tracks in ISOBMFF. International Organisation for Standardisation, Coding of Moving Pictures and Audio, ISO/IEC JTC1/SC29/WG11, MPEG2019/m47335. Mar. 2019: 12 pages.

Wang et al., Timed Metadata for (Recommended) Viewports of V-PCC Content in ISOBMFF. International Organisation for Standardisation, Coding of Moving Pictures and Audio, ISO/IEC JTC1/SC29/WG11, MPEG2016/M46208. Jan. 2019:11 pages.

Wang et al., Track Derivation for Storage of V-PCC Content in ISOBMFF. International Organisation for Standardisation, Coding of Moving Pictures and Audio, ISO/IEC JTC1/SC29/WG11, MPEG2016/M46207. Jan. 2019:6 pages.

Wang et al., WD 4 of ISO/IEC 23090-2 OMAF 2nd edition. International Organisation for Standardisation, Coding of Moving Pictures and Audio, ISO/IEC JTC1/SC29/WG11, N18227-v1. Jan. 2019:227 pages.

* cited by examiner

```
aligned(8) class SubPictureRegionBox extends FullBox('sprg',0,0) {
    unsigned int(16) object_x;       ← 902
    unsigned int(16) object_y;       ← 904
    unsigned int(16) object_width;   ← 906
    unsigned int(16) object_height;  ← 908
    bit(14) reserved = 0;
    unsigned int(1) track_not_alone_flag;     ← 910
    unsigned int(1) track_not_mergable_flag;  ← 912
}
```

```
class SpatialRelationship2DGroupEntry extends VisualSampleGroupEntry('2dcc') {
    unsigned int(16) object_x;      // 1104
    unsigned int(16) object_y;      // 1106
    unsigned int(16) object_width;  // 1108
    unsigned int(16) object_height; // 1110
}
```

```
aligned(8) class SubVolumetricRegionBox extends FullBox('svrg',0,0) {    1300
    unsigned int(16) object_x;       1302
    unsigned int(16) object_y;       1304
    unsigned int(16) object_z;       1306
    unsigned int(16) object_width;   1308
    unsigned int(16) object_height;  1310
    unsigned int(16) object_depth;   1312
    bit(14) reserved = 0;
    unsigned int(1) track_not_alone_flag;     1314
    unsigned int(1) track_not_mergable_flag;  1316
}
```

FIG. 13

METHODS AND APPARATUS FOR SIGNALING SPATIAL RELATIONSHIPS FOR POINT CLOUD MULTIMEDIA DATA TRACKS

RELATED APPLICATIONS

This Application claims priority under 35 U.S.C. § 119(e) to U.S. Provisional Application Ser. No. 62/818,785, filed Mar. 15, 2019, entitled "METHODS OF SIGNALING OF 2D AND 3D SPATIAL RELATIONSHIP AND SAMPLE GROUPS FOR V-PCC VISUAL (SUB-PICTURE AND SUB-VOLUMETRIC) TRACKS IN ISOBMFF," which is herein incorporated by reference in its entirety.

TECHNICAL FIELD

The techniques described herein relate generally to video coding, and particularly to signaling spatial relationships and sample groups for point cloud video content tracks, including signaling two-dimensional (2D) and/or three-dimensional (3D) spatial relationship and sample groups for video-based point cloud compression (V-PCC) sub-picture and sub-volumetric tracks.

BACKGROUND OF INVENTION

Various types of video content, such as 2D content, 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangle projection can be used to put the spherical map into a two-dimensional image. This can be done, for example, to use two-dimensional encoding and compression techniques. Ultimately, the encoded and compressed content is stored and delivered using a desired delivery mechanism (e.g., thumb drive, digital video disk (DVD) and/or online streaming). Such video can be used for virtual reality (VR), and/or 3D video.

At the client side, when the client processes the content, a video decoder decodes the encoded video and performs a reverse-projection to put the content back onto the sphere. A user can then view the rendered content, such as using a head-worn viewing device. The content is often rendered according to the user's viewport, which represents the angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder does not know what the user will actually view, then the whole encoding and decoding process will process the entire spherical content. This can allow, for example, the user to view the content at any particular viewport and/or area, since all of the spherical content is delivered and decoded.

However, processing all of the spherical content can be compute intensive and can consume significant bandwidth. For example, for online streaming applications, processing all of the spherical content can place a large burden on network bandwidth. Therefore, it can be difficult to preserve a user's experience when bandwidth resources and/or compute resources are limited. Some techniques only process the content being viewed by the user. For example, if the user is viewing the front (e.g., or north pole), then there is no need to deliver the back part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for processing (e.g., encoding or decoding) point cloud video data in a structure that comprises a plurality of tracks that carry the point cloud video data (e.g., including 2D and 3D point cloud data). The point cloud video data can be partitioned into regions or groups of 2D tracks (e.g., sub-picture tracks) and/or 3D tracks (e.g., sub-volumetric tracks). The techniques provide for signaling spatial relationships and sample groups for point cloud video content tracks, including signaling 2D and/or 3D spatial relationship and sample groups.

Some embodiments relate to a decoding method for decoding video data. The method includes receiving point cloud video data, wherein the point cloud video data comprises a plurality of tracks, accessing first metadata of a first track of the plurality of tracks, the first metadata specifying a first source region of a plurality of source regions of the point cloud video data, wherein each source region corresponds to a different spatial portion of the point cloud video data and a sub-region of the first track in the first source region comprising data indicative of a spatial position of video data of the first track in the first source region, and generating, based on the first metadata, point cloud media for the sub-region of the first source region using the video data of the first track.

In some examples, the first metadata comprises first 2D spatial relationship description metadata, the first source region comprises a 2D source box, and the sub-region comprises a sub-picture region for the first track.

In some examples, the plurality of tracks comprises a three-dimensional (3D) sub-volumetric track group comprising the first track, and the first metadata comprises first 3D spatial relationship description metadata, the first source region comprises a 3D source box, and the sub-region comprises a sub-volumetric region for the first track. The 3D sub-volumetric track group can include at least one geometry track comprising geometry data, at least one attribute track comprising attribute data, and an occupancy track comprising occupancy map data, and generating the point cloud media for the sub-region of the first source region can include generating the point cloud media using the geometry data, the attribute data, and the occupancy map data.

In some examples, accessing second metadata of a second track of the plurality of tracks, the second metadata specifying the first source region, a second sub-region of the second track in the first source region comprising data indicative of a spatial position of video data of the second track in the first source region, and generating, based on the second metadata, point cloud media for the second sub-region of the first source region using the video data of the second track.

In some examples, metadata specifying the first source region includes data indicative of a width of the first source region, a height of the first source region, a depth of the first source region, or some combination thereof.

In some examples, metadata specifying the sub-region comprises data indicative of a position of the sub-region in the first source region, and a width of the sub-region, a height of the sub-region, a depth of the sub-region, or some combination thereof.

Some embodiments relate to a method for encoding video data. The method includes encoding point cloud video data comprising encoding a plurality of tracks, including determining a first source region of a plurality of source regions of the point cloud video data, wherein each source region corresponds to a different spatial portion of the point cloud video data, and determining a sub-region of the first track in the first source region, comprising determining data indicative of a spatial position of video data in the first source region. The method includes encoding, based on the determined first source region and the determined sub-region of the first track, the point cloud video data comprising encoding the video data in a first track, and encoding first metadata of the first rack comprising metadata specifying the first source region and the sub-region.

In some examples, the first metadata comprises first 2D spatial relationship description metadata, the first source region comprises a 2D source box, and the sub-region comprises a sub-picture region for the first track.

In some examples, the plurality of tracks comprises a three-dimensional (3D) sub-volumetric track group comprising the first track, and the first metadata comprises first 3D spatial relationship description metadata, the first source region comprises a 3D source box, and the sub-region comprises a sub-volumetric region for the first track. The 3D sub-volumetric track group can further include at least one geometry track comprising geometry data, at least one attribute track comprising attribute data, and an occupancy track comprising occupancy map data, and generating the point cloud media for the sub-region of the first source region can include generating the point cloud media using the geometry data, the attribute data, and the occupancy map data.

In some examples, metadata specifying the first source region comprises data indicative of a width of the first source region, a height of the first source region, a depth of the first source region, or some combination thereof.

In some examples, metadata specifying the sub-region includes data indicative of a position of the sub-region in the first source region, and a width of the sub-region, a height of the sub-region, a depth of the sub-region, or some combination thereof.

Some embodiments relate to an apparatus configured to decode video data. The apparatus includes a processor in communication with memory. The processor is configured to execute instructions stored in the memory that cause the processor to perform receiving point cloud video data, wherein the point cloud video data comprises a plurality of tracks, accessing first metadata of a first track of the plurality of tracks, the first metadata specifying a first source region of a plurality of source regions of the point cloud video data, wherein each source region corresponds to a different spatial portion of the point cloud video data and a sub-region of the first track in the first source region comprising data indicative of a spatial position of video data of the first track in the first source region, and generating, based on the first metadata, point cloud media for the sub-region of the first source region using the video data of the first track.

In some examples, the first metadata comprises first 2D spatial relationship description metadata, the first source region comprises a 2D source box, and the sub-region comprises a sub-picture region for the first track.

In some examples, the plurality of tracks comprises a three-dimensional (3D) sub-volumetric track group comprising the first track, and the first metadata comprises first 3D spatial relationship description metadata, the first source region comprises a 3D source box, and the sub-region comprises a sub-volumetric region for the first track.

In some examples, the 3D sub-volumetric track group further includes at least one geometry track comprising geometry data, at least one attribute track comprising attribute data, and an occupancy track comprising occupancy map data, and generating the point cloud media for the sub-region of the first source region comprises generating the point cloud media using the geometry data, the attribute data, and the occupancy map data.

In some examples, the instructions further cause the processor to perform accessing second metadata of a second track of the plurality of tracks, the second metadata specifying the first source region and a second sub-region of the second track in the first source region comprising data indicative of a spatial position of video data of the second track in the first source region, and generating, based on the second metadata, point cloud media for the second sub-region of the first source region using the video data of the second track.

In some examples, metadata specifying the first source region includes data indicative of a width of the first source region, a height of the first source region, a depth of the first source region, or some combination thereof.

In some examples, metadata specifying the sub-region comprises data indicative of a position of the sub-region in the first source region, and a width of the sub-region, a height of the sub-region, a depth of the sub-region, or some combination thereof.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 9 shows an exemplary syntax for metadata for a sub picture region, according to some embodiments.

FIG. 11 shows an example of a spatial relationship 2D group, according to some embodiments.

FIG. 13 shows an exemplary syntax for metadata for a sub picture region, according to some embodiments.

DETAILED DESCRIPTION OF INVENTION

Point cloud data, such as Video-based Point Cloud Compression (V-PCC) data can provide compressed point cloud data for various types of 3D multimedia applications. The inventors have appreciated that it is desirable to provide techniques for encoding and/or decoding point cloud video data using a track structure that leverages a plurality of video data tracks. For example, it can be desirable to only process and display point cloud content that will be viewed by the user (e.g., to only process video data for a viewport to avoid processing content that will not be displayed). User interaction information can allow a user to select different viewports, which can in turn be used to signal to devices which point cloud data to process accordingly. For example, user interaction information can be used to allow a user to select different viewpoints in the point cloud data, and to change the point cloud data processing based on such user selection/interaction. The inventors have appreciated that in order to improve video processing capabilities (e.g., including improving processing efficiency and/or bandwidth efficiency) such viewport-dependent techniques may only need to process video data associated with the viewport, such that if the video data can be carried by a plurality of point cloud video data tracks, only the tracks associated with the viewport need to be processed (e.g., transmitted and/or decoded) to provide the desired user experience.

The techniques described herein provide for encoding and/or decoding point cloud content, such as V-PCC content, using a track structure that comprises a plurality of point cloud video data tracks. The techniques provide for partitioning point cloud content into a plurality of tracks in order to carry the point cloud content in a multi-track video content structure. For example, 2D point cloud content (e.g., associated with a 2D region) can be partitioned into a plurality of sub-picture tracks. As another example, 3D point cloud content (e.g., associated with a 3D region) can be partitioned into a plurality of sub-volumetric tracks. As described herein, spatial relationships and/or sample groups of the point cloud video content tracks can be signaled using metadata, including signaling 2D and/or 3D spatial relationships and sample groups. Such techniques can allow for efficient point cloud video processing, including providing viewport-dependent content processing of point cloud data.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
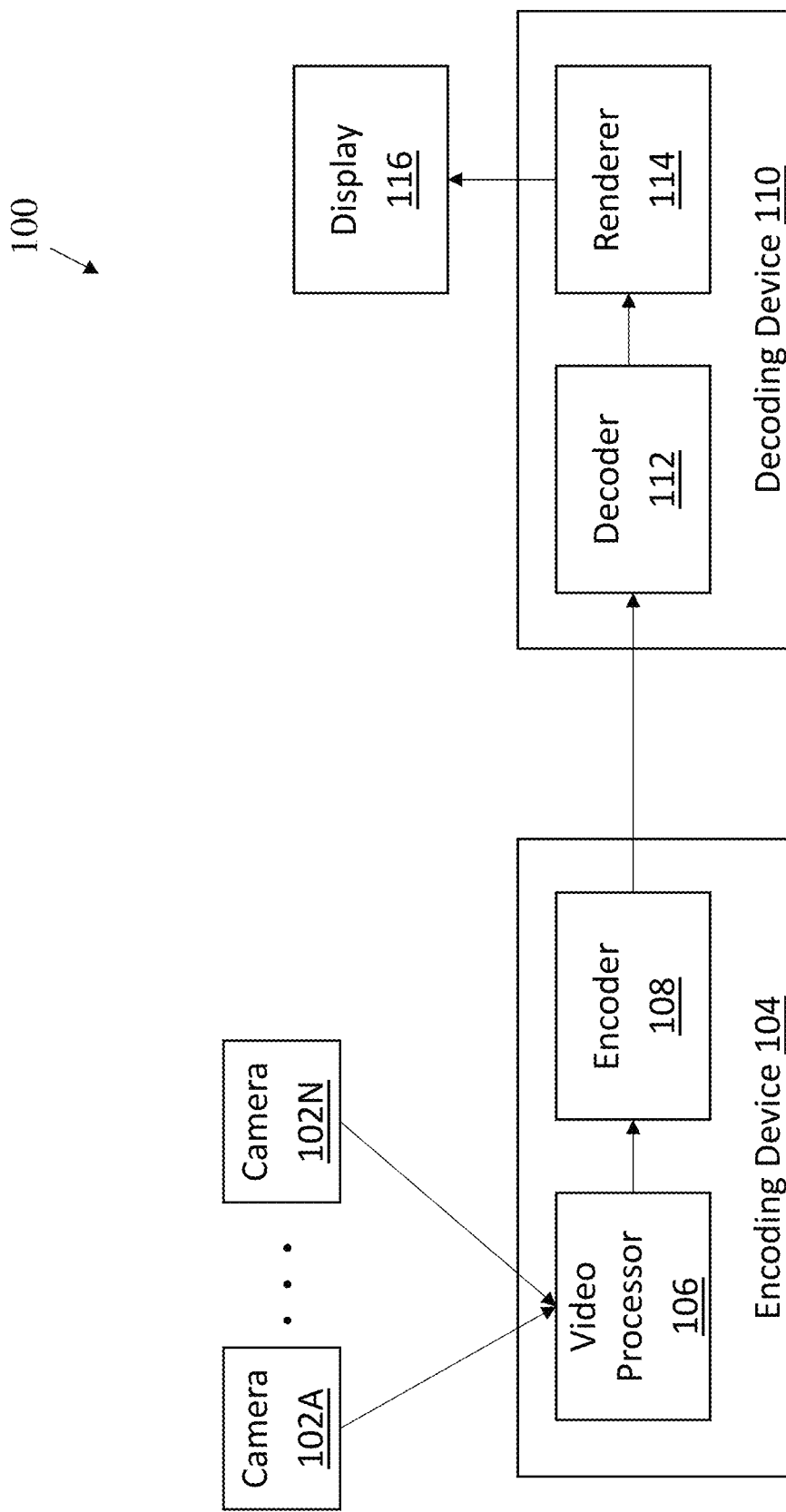
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a portion of a head-worn display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
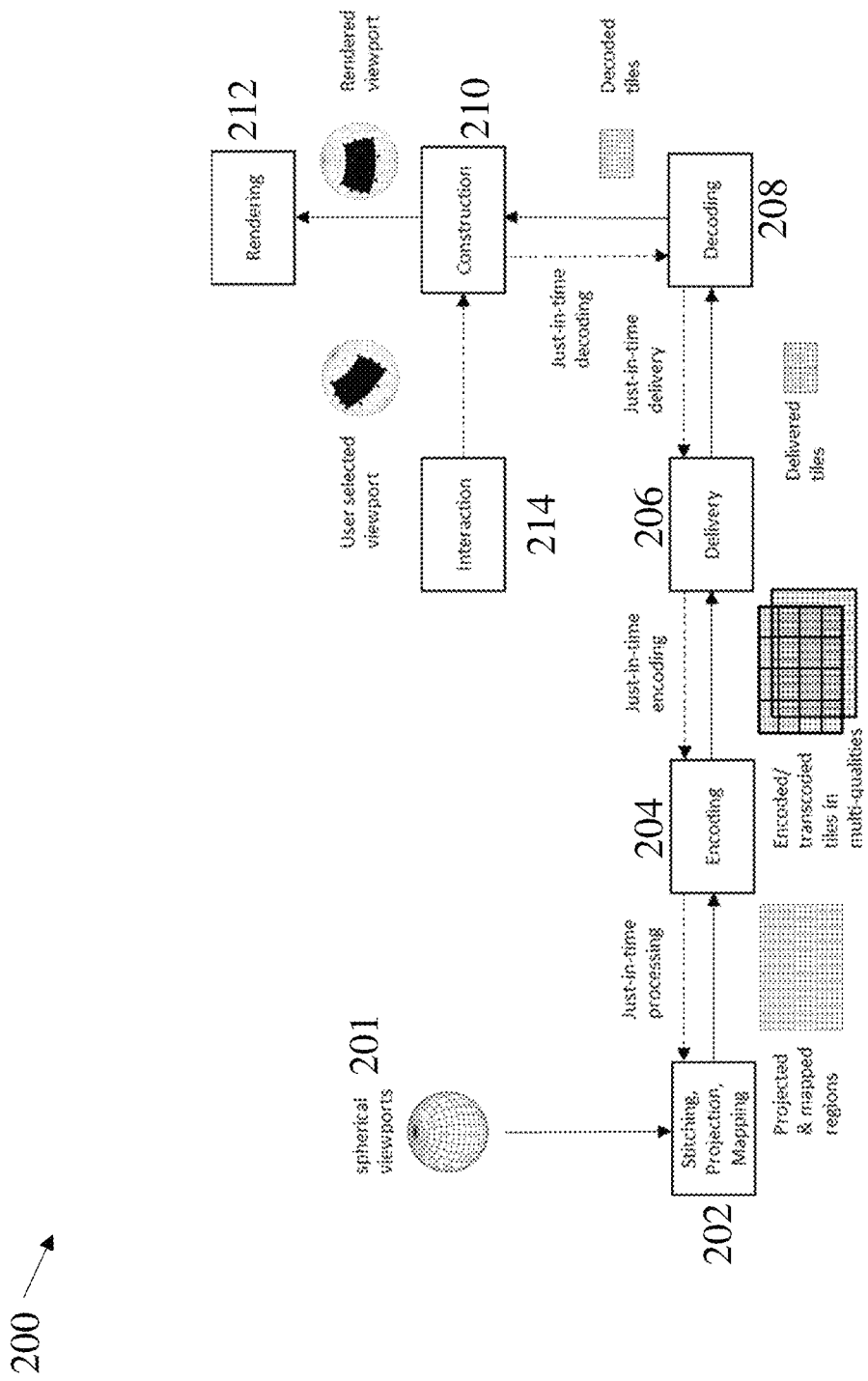
FIG. 2 shows a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared. In such implementations, a region of interest typically has a separate video track that carries the ROI content. Thus, the encoded video specifies the ROI, and how the ROI video is associated with the underlying video. The techniques described herein are described in terms of a region, which can include a viewport, a ROI, and/or other areas of interest in video content.

ROI or viewport tracks can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191, also ISO/IEC 23001-10:2015), which is hereby incorporated by reference herein in its entirety, describes an ISO Base Media File Format (ISOBMFF) file format that uses a timed metadata track to signal that a main 2D video track has a 2D ROI track. As another example, Dynamic Adaptive Streaming over HTTP (DASH) includes a spatial relationship descriptor to signal the spatial relationship between a main 2D video representation and its associated 2D ROI video representations. ISO/IEC 23009-1, draft third edition (w10225), Jul. 29, 2016, addresses DASH, and is hereby incorporated by reference herein in its entirety. As a further example, the Omnidirectional MediA Format (OMAF) is specified in ISO/IEC 23090-2, which is hereby incorporated by reference herein in its entirety. OMAF specifies the omnidirectional media format for coding, storage, delivery, and rendering of omnidirectional media. OMAF specifies a coordinate system, such that the user's viewing perspective is from the center of a sphere looking outward towards the inside surface of the sphere. OMAF includes extensions to ISOBMFF for omnidirectional media as well as for timed metadata for sphere regions.

When signaling an ROI, various information may be generated, including information related to characteristics of the ROI (e.g., identification, type (e.g., location, shape, size), purpose, quality, rating, etc.). Information may be generated to associate content with an ROI, including with the visual (3D) spherical content, and/or the projected and mapped (2D) frame of the spherical content. An ROI can be characterized by a number of attributes, such as its identification, location within the content it is associated with, and its shape and size (e.g., in relation to the spherical and/or 3D content). Additional attributes like quality and rate ranking of the region can also be added, as discussed further herein.

Point cloud data can include a set of 3D points in a scene. Each point can be specified based on an (x, y, z) position and color information, such as (R,V,B), (Y,U,V), reflectance, transparency, and/or the like. The point cloud points are typically not ordered, and typically do not include relations with other points (e.g., such that each point is specified without reference to other points). Point cloud data can be useful for many applications, such as 3D immersive media experiences that provide 6DoF. However, point cloud information can consume a significant amount of data, which in turn can consume a significant amount of bandwidth if being transferred between devices over network connections. For example, 800,000 points in a scene can consume 1 Gbps, if uncompressed. Therefore, compression is typically needed in order to make point cloud data useful for network-based applications.

Figure 3:
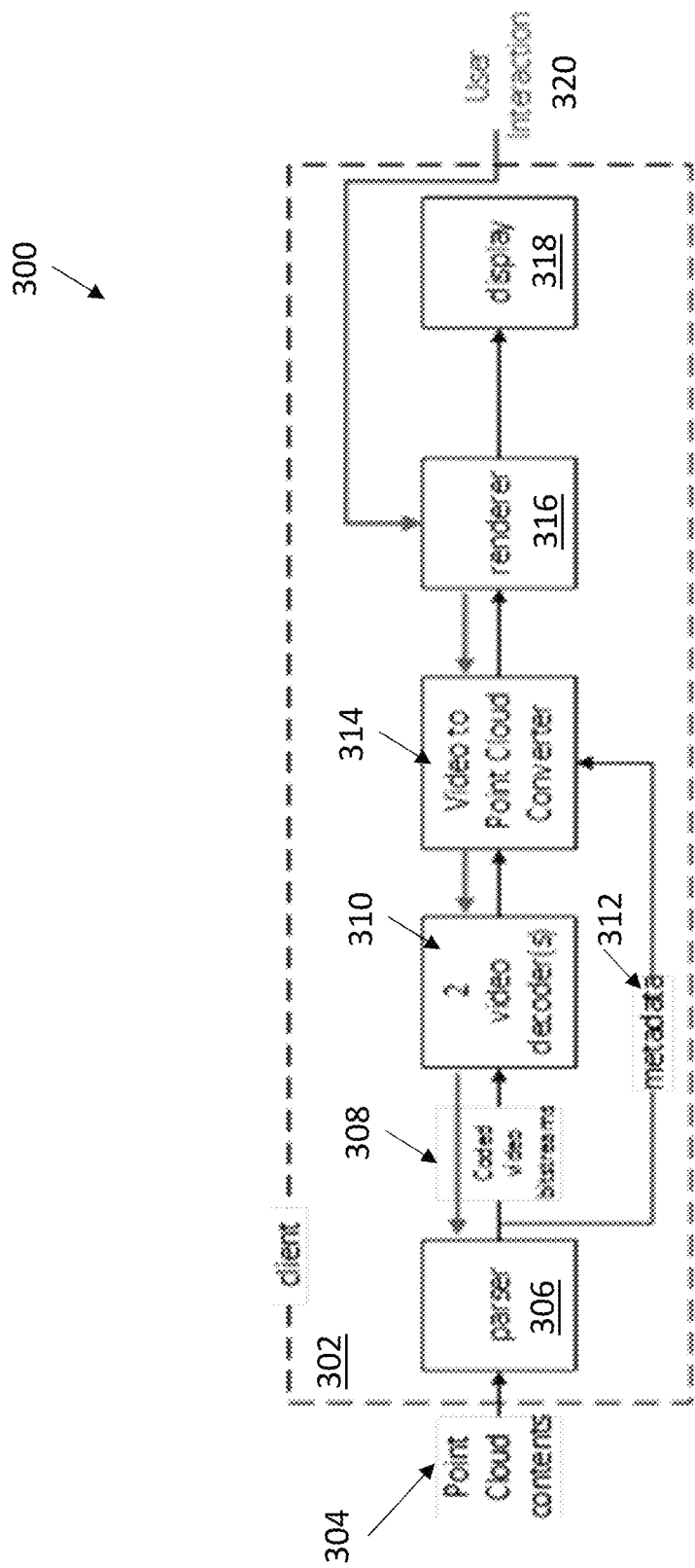
FIG. 3 shows an exemplary processing flow for point cloud content, according to some examples.

MPEG has been working on point cloud compression to reduce the size of point cloud data, which can enable streaming of point cloud data in real-time for consumption on other devices. FIG. 3 shows an exemplary processing flow 300 for point cloud content as a specific instantiation of the general viewport/ROI (e.g., 3DoF/6DoF) processing model, according to some examples. The processing flow 300 is described in further detail in, for example, N17771, "PCC WD V-PCC (Video-based PCC)," July 2018, Ljubljana, SI, which is hereby incorporated by reference herein in its entirety. The client 302 receives the point cloud media content file 304, which is composed of two 2D planar video bitstreams and metadata that specifies a 2D planar video to 3D volumetric video conversion. The content 2D planar video to 3D volumetric video conversion metadata can be located either at the file level as timed metadata track(s) or inside the 2D video bitstream as SEI messages.

The parser module 306 reads the point cloud contents 304. The parser module 306 delivers the two 2D video bitstreams 308 to the 2D video decoder 310. The parser module 306 delivers the 2D planar video to 3D volumetric video conversion metadata 312 to the 2D video to 3D point cloud converter module 314. The parser module 306 at the local client can deliver some data that requires remote rendering (e.g., with more computing power, specialized rendering engine, and/or the like) to a remote rendering module (not shown) for partial rendering. The 2D video decoder module 310 decodes the 2D planar video bistreams 308 to generate 2D pixel data. The 2D video to 3D point cloud converter module 314 converts the 2D pixel data from the 2D video decoder(s) 310 to 3D point cloud data if necessary using the metadata 312 received from the parser module 306.

The renderer module 316 receives information about users' 6 degree viewport information and determines the portion of the point cloud media to be rendered. If a remote renderer is used, the users' 6DoF viewport information can also be delivered to the remote render module. The renderer module 316 generates point cloud media by using 3D data, or a combination of 3D data and 2D pixel data. If there are partially rendered point cloud media data from a remote renderer module, then the renderer 316 can also combine such data with locally rendered point cloud media to generate the final point cloud video for display on the display 318. User interaction information 320, such as a user's location in 3D space or the direction and viewpoint of the user, can be delivered to the modules involved in processing the point cloud media (e.g., the parser 306, the 2D video decoder(s) 310, and/or the video to point cloud converter 314) to dynamically change the portion of the data for adaptive rendering of content according to the user's interaction information 320.

Figure 4:
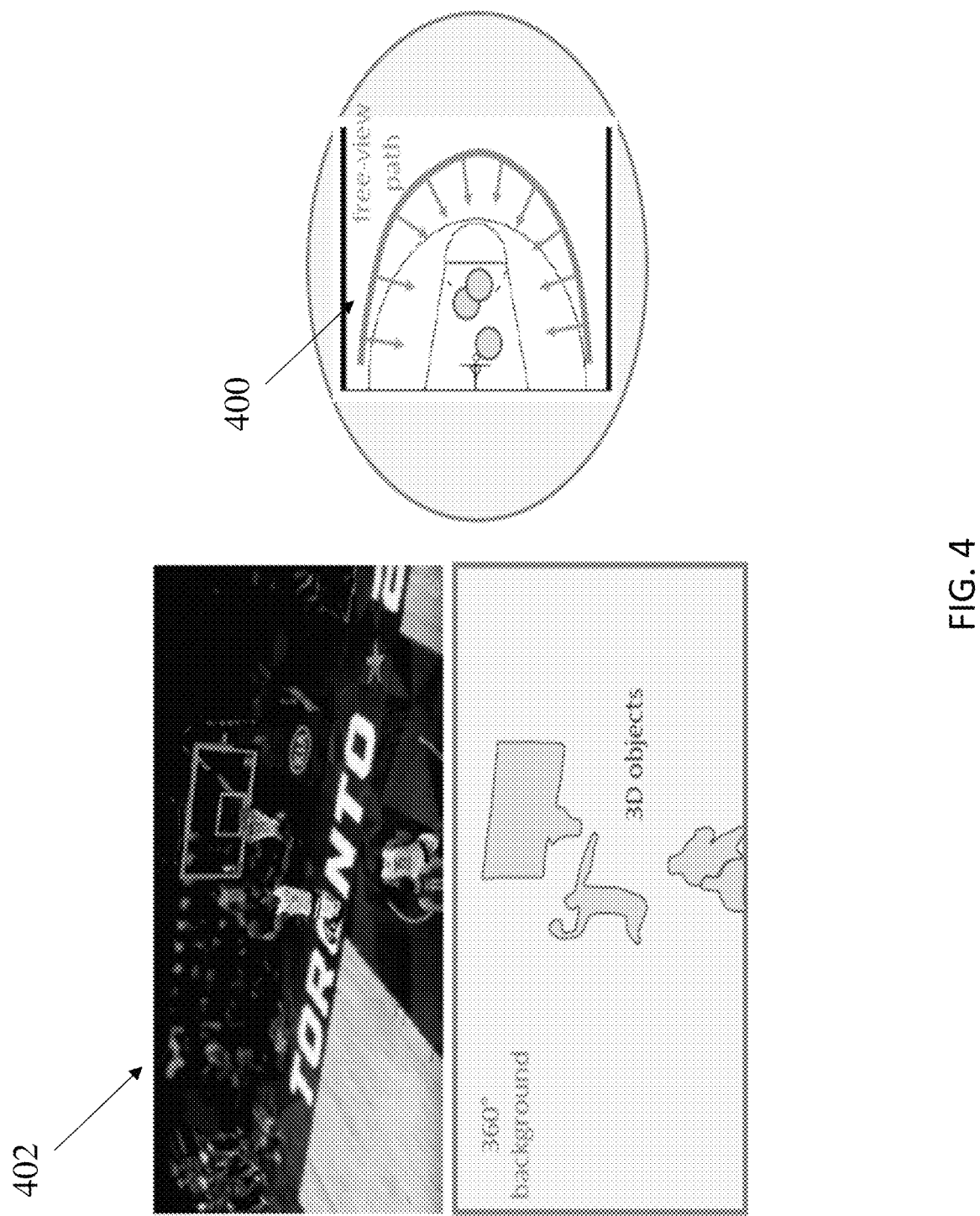
FIG. 4 shows an example of a free-view path, according to some examples.

User interaction information for point cloud media needs to be provided for in order to achieve such user interaction-based rendering. In particular, the user interaction information 320 needs to be specified and signaled in order for the client 302 to communicate with the render module 316, including to provide information of user-selected viewports. Point cloud content can be presented to the user via editor cuts, or as recommended or guided views or viewports. FIG. 4 shows an example of a free-view path 400, according to some examples. The free-view path 400 allows the user to move about the path to view the scene 402 from different viewpoints.

Viewports, such as recommended viewports (e.g., Video-based Point Cloud Compression (V-PCC) viewports), can be signaled for point cloud content. A point cloud viewport, such as a PCC (e.g., V-PCC or G-PCC (Geometry based Point Cloud Compression)) viewport, can be a region of point cloud content suitable for display and viewing by a user. Depending on a user's viewing device(s), the viewport can be a 2D viewport or a 3D viewport. For example, a viewport can be a 3D spherical region or a 2D planar region in the 3D space, with six degrees of freedom (6 DoF). The techniques can leverage 6D spherical coordinates (e.g., '6dsc') and/or 6D Cartesian coordinates (e.g., '6dcc') to provide point cloud viewports. Viewport signaling techniques, including leveraging '6dsc' and '6dcc,' are described in co-owned U.S. patent application Ser. No. 16/738,387, titled "Methods and Apparatus for Signaling Viewports and Regions of Interest for Point Cloud Multimedia Data," which is hereby incorporated by reference herein in its entirety. The techniques can include the 6D spherical coordinates and/or 6D Cartesian coordinates as timed metadata, such as timed metadata in ISOBMFF. The techniques can use the 6D spherical coordinates and/or 6D Cartesian coordinates to specify 2D point cloud viewports and 3D point cloud viewports, including for V-PCC content stored in ISOBMFF files. As described herein, the '6dsc' and '6dcc' are natural extensions to the 2D Cartesian coordinates '2dcc' for planar regions in the 2D space, as provided for in MPEG-B part 10.

In V-PCC, the geometry and texture information of a video-based point cloud is converted to 2D projected frames and then compressed as a set of different video sequences. The video sequences can be of three types: one representing the occupancy map information, a second representing the geometry information and a third representing the texture information of the point cloud data. A geometry track may contain, for example, one or more geometric aspects of the point cloud data, such as shape information, size information, and/or position information of a point cloud. A texture track may contain, for example, one or more texture aspects of the point cloud data, such as color information (e.g., RGB (Red, Green, Blue) information), opacity information, reflectance information and/or albedo information of a point cloud. These tracks can be used for reconstructing the set of 3D points of the point cloud. Additional metadata needed to interpret the geometry and video sequences, such as auxiliary patch information, can also be generated and compressed separately. While examples provided herein are explained in the context of V-PCC, it should be appreciated that such examples are intended for illustrative purposes, and that the techniques described herein are not limited to V-PCC.

V-PCC has yet to finalize a track structure. An exemplary track structure under consideration in the working draft of V-PCC in ISOBMFF is described in N18059, "WD of Storage of V-PCC in ISOBMFF Files," October 2018, Macau, CN, which is hereby incorporated by reference herein in its entirety. The track structure can include a track that includes a set of patch streams, where each patch stream is essentially a different view for looking at the 3D content. As an illustrative example, if the 3D point cloud content is thought of as being contained within a 3D cube, then there can be six different patches, with each patch being a view of one side of the 3D cube from the outside of the cube. The track structure also includes a timed metadata track and a set of restricted video scheme tracks for geometry, attribute (e.g., texture), and occupancy map data. The timed metadata track contains V-PCC specified metadata (e.g., parameter sets, auxiliary information, and/or the like). The set of restricted video scheme tracks can include one or more restricted video scheme tracks that contain video-coded elementary streams for geometry data, one or more restricted video scheme tracks that contain video coded elementary streams for texture data, and a restricted video scheme track containing a video-coded elementary stream for occupancy map data. The V-PCC track structure can allow changing and/or selecting different geometry and texture data, together with the timed metadata and the occupancy map data, for variations of viewport content. It can be desirable to include multiple geometry and/or texture tracks for a variety of scenarios. For example, the point cloud may be encoded in both a full quality and one or more reduced qualities, such as for the purpose of adaptive streaming. In such examples, the encoding may result in multiple geometry/texture tracks to capture different samplings of the collection of 3D points of the point cloud. Geometry/texture tracks corresponding to finer samplings can have better qualities than those corresponding to coarser samplings. During a session of streaming the point cloud content, the client can choose to retrieve content among the multiple geometry/texture tracks, in either a static or dynamic manner (e.g., according to client's display device and/or network bandwidth).

A point cloud tile can represent 3D and 2D aspects of point cloud data. For example, as described in N18188, entitled "Description of PCC Core Experiment 2.19 on V-PCC tiles, Marrakech, MA (January 2019), V-PCC tiles can be used for Video-based PCC. An example of Video-based PCC is described in N18180, entitled "ISO/IEC 23090-5: Study of CD of Video-based Point Cloud Compression (V-PCC)," Marrakech, MA (January 2019). Both N18188 and N18180 are hereby incorporated by reference herein in their entirety. A point cloud tile can include bounding regions or boxes to represent the content or portions thereof, including bounding boxes for the 3D content and/or bounding boxes for the 2D content. In some examples, a point cloud tile includes a 3D bounding box, an associated 2D bounding box, and one or more independent coding unit(s) (ICUs) in the 2D bounding box. A 3D bounding box can be, for example, a minimum enclosing box for a given point set in three dimensions. A 3D bounding box can have various 3D shapes, such as the shape of a rectangular parallelpiped that can be represented by two 3-tuples (e.g., the origin and the length of each edge in three dimensions). A 2D bounding box can be, for example, a minimum enclosing box (e.g., in a given video frame) corresponding to the 3D bounding box (e.g., in 3D space). A 2D bounding box can have various 2D shapes, such as the shape of a rectangle that can be represented by two 2-tuples (e.g., the origin and the length of each edge in two dimensions). There can be one or more ICUs (e.g., video tiles) in a 2D bounding box of a video frame. The independent coding units can be encoded and/or decoded without the dependency of neighboring coding units.

Figure 5:
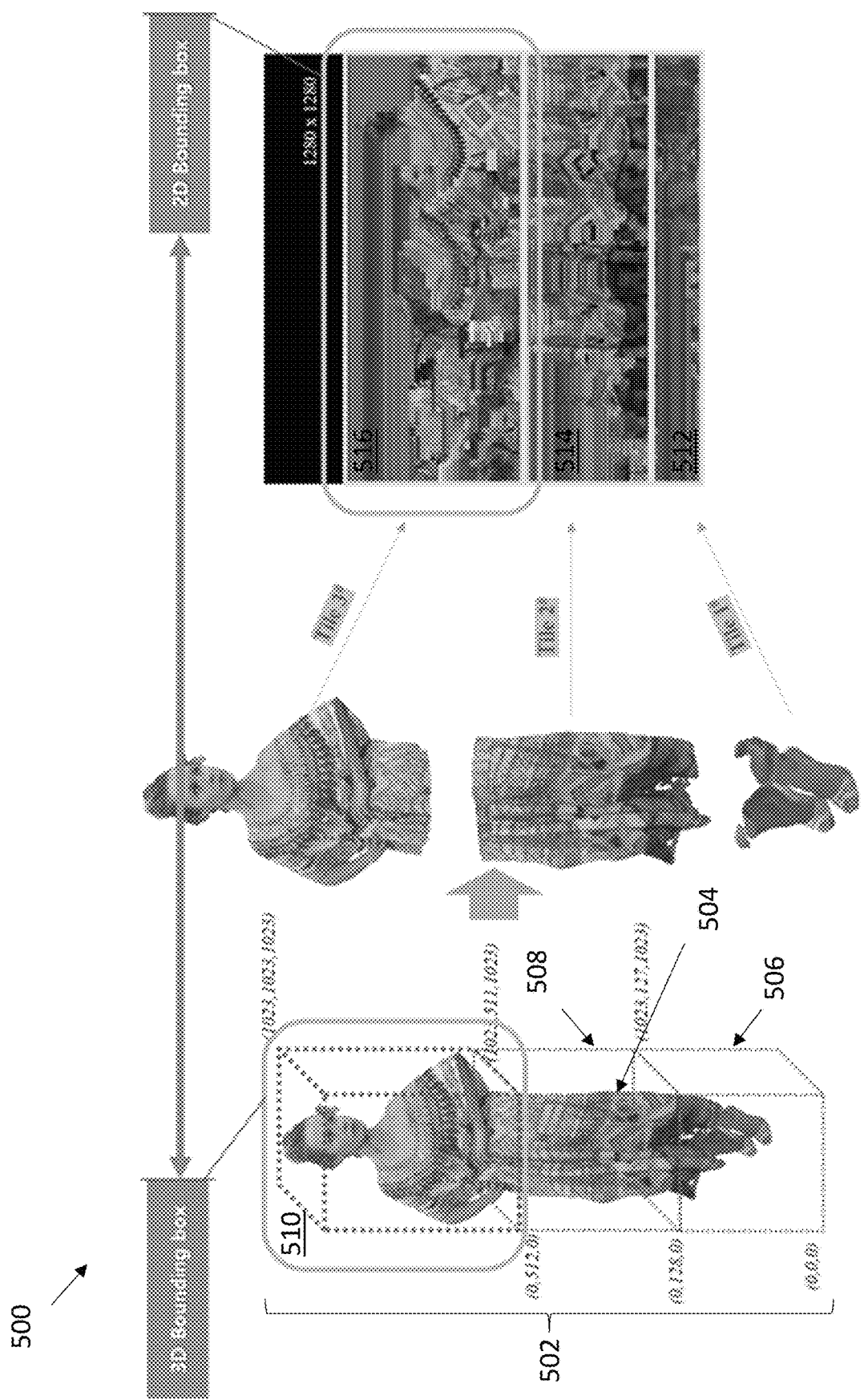
FIG. 5 is a diagram showing exemplary point cloud tiles, including 3D and 2D bounding boxes, according to some examples.

FIG. 5 is a diagram showing exemplary point cloud tiles, including 3D and 2D bounding boxes, according to some examples. Point cloud content typically only includes a single 3D bounding box around the 3D content, shown in FIG. 5 as the large box 502 surrounding the 3D point cloud content 504. As described above, a point cloud tile can include a 3D bounding box, an associated 2D bounding box, and one or more independent coding unit(s) (ICUs) in the 2D bounding box. To support viewport dependent processing, the 3D point cloud content typically needs to be subdivided into smaller pieces or tiles. FIG. 5 shows, for example, the 3D bounding box 502 can be divided into smaller 3D bounding boxes 506, 508 and 510, which each have an associated 2D bounding box 512, 514 and 516, respectively.

The inventors have discovered and appreciated that existing techniques for representing 3D and 2D point cloud content only provide the content in a single bit stream. For example, while V-PCC content can include various tiles (e.g., with associated 3D and 2D bounding boxes), the tiles are included in just a single bit stream. In particular, while point cloud track structures can allow for different tracks for point cloud aspects such as for geometry and/or attributes/textures, the inventors have appreciated that the point cloud video content is only carried in a single bit stream.

The inventors have developed improvements to existing point cloud technology that can be used to store and deliver point cloud content in a plurality of (separate) point cloud content tracks. The techniques can include, for example, sub-dividing the tiles (e.g., sub-dividing 3D/2D bounding boxes) into smaller units to form desired ICUs for V-PCC content. The techniques can encapsulate the sub-divided 3D volumetric regions and 2D pictures into tracks, such as into ISOBMFF visual (e.g., sub-volumetric and sub-picture) tracks. For example, the content of each bounding box can be stored into associated sets of tracks, where each of the sets of tracks stores the content of one of the sub-divided 3D sub-volumetric regions and/or 2D sub-pictures. For the 3D sub-volumetric case, such a set of tracks include tracks that store geometry, attribute and texture attributes. For the 2D sub-picture case, such a set of tracks may just contain a single track that stores the sub-picture content. The techniques can provide for signaling relationships among the sets of tracks, such as signaling the respective 3D/2D spatial relationships of the sets of tracks using track groups and/or sample groups of '3dcc' and '2dcc' types. The techniques can signal the tracks associated with a particular bounding box, a particular sub-volumetric region or a particular sub-picture, and/or can signal relationships among the sets of tracks of different bounding boxes, sub-volumetric regions and sub-pictures. Providing point cloud content in separate tracks can facilitate advanced media processing not otherwise available for point cloud content, such as point cloud tiling (e.g., V-PCC tiling) and viewport-dependent media processing.

In some embodiments, the techniques provide for dividing the point cloud bounding boxes into sub-units. For example, the 3D and 2D bounding boxes can be sub-divided into 3D sub-volumetric boxes and 2D sub-picture regions, respectively. The sub-regions can provide ICUs that are sufficient for track-based rendering techniques. For example, the sub-regions can provide ICUs that are fine enough from a systems point of view for delivery and rendering in order to support the viewport dependent media processing. In some embodiments, the techniques can support viewport dependent media processing for V-PCC media content, e.g., as provided in m46208, entitled "Timed Metadata for (Recommended) Viewports of V-PCC Content in ISOBMFF," Marrakech, MA (January 2019), which his hereby incorporated by reference herein in its entirety. As described further herein, each of the sub-divided 3D sub-volumetric boxes and 2D sub-picture regions can be stored in tracks in a similar manner as if they are (e.g., un-sub-divided) 3D boxes and 2D pictures, respectively, but with smaller sizes in terms of their dimensions. For example, in the 3D case, a sub-divided 3D sub-volumetric box/region will be stored in a set of tracks comprising geometry, texture and attribute tracks. As another example, in the 2D case, a sub-divided sub-picture region will be stored in a single (sub-picture) track. As a result of sub-dividing the content into smaller sub-volumes and sub-pictures, the ICUs can be carried in various ways. For example, in some embodiments different sets of tracks can be used to carry different sub-volumes or sub-pictures, such that the tracks carrying the sub-divided content have less data compared to when storing all of the un-sub-divided content. As another example, in some embodiments some and/or all of the data (e.g., even when subdivided) can be stored in the same tracks, but with smaller units for the sub-divided data and/or ICUs (e.g., so that the ICUs can be individually accessed in the overall set of track(s)).

Figure 6:
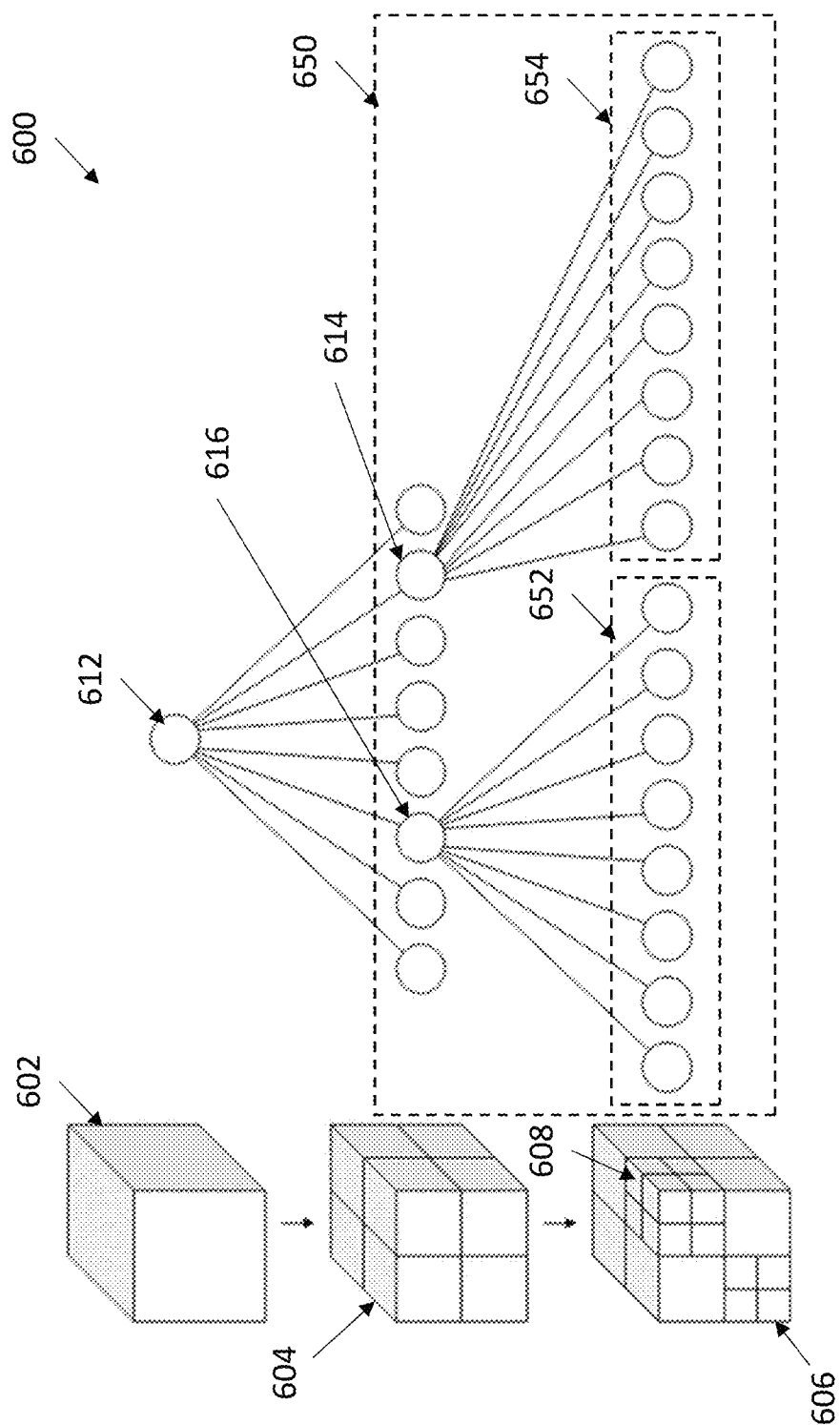
FIG. 6 is a diagram showing an exemplary octree-based division for 3D sub-volumetric decomposition, according to some embodiments.

Various types of division can be used to provide the sub-units or ICUs, including 3D and 2D divisions. FIG. 6 is a diagram 600 showing an exemplary octree-based division for 3D sub-volumetric decomposition, according to some embodiments. As shown on the left, a 3D bounding box 602 can be divided into eight sub-regions 604, which can be further sub-divided as shown for sub-regions 606 and 608. In some embodiments, the system can determine how to divide and further sub-divided the point cloud content based on various parameters, such as the ROIs associated with the point cloud content, an amount of detail that is supported for a particular side, and/or the like. Referring to the tree structure, each interior node (e.g., nodes 612, 614 and 616) in the tree represents a 3D source, which is divided into a plurality of regions such that each sub-node represents the sub-volumetric tracks. As described further herein, a track group (e.g., a '3dcc' track group) can be used to represent the sub-volumetric tracks.

Figure 7:
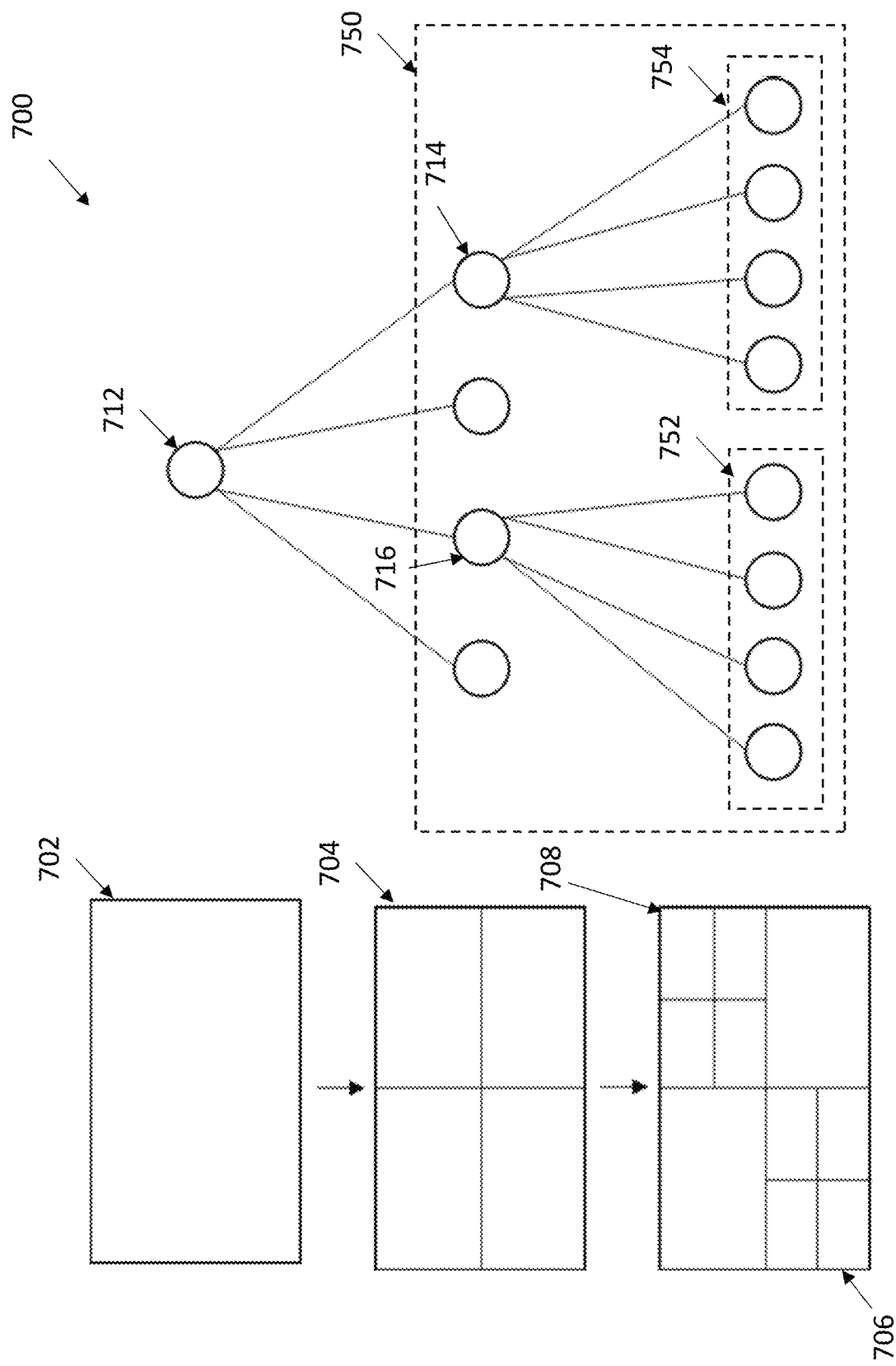
FIG. 7 is a diagram showing an exemplary quadtree-based division for 2D sub-picture decomposition, according to some embodiments.

FIG. 7 is a diagram 700 showing an exemplary quadtree-based division for 2D sub-picture decomposition, according to some embodiments. As shown on the left, a 2D bounding box 702 can be divided into four sub-regions 704, which can be further sub-divided as shown for sub-regions 706 and 708. Each interior node (e.g., nodes 712, 714 and 716) in the tree represents a 2D source, which is divided into a plurality of regions such that each sub-node represents the sub-picture tracks. As described further herein, a track group (e.g., a '2dcc' track group) can be used to represent the sub-picture tracks.

The subdivided 2D and 3D regions may be of various shapes, such as squares, cubes, rectangles, and/or arbitrary shapes. The division along each dimension may not be binary. Therefore, each division tree of an outer-most 2D/3D bounding box can be much more general than the quadtree and octree examples provided herein. It should therefore be appreciated that various shapes and subdivision strategies can be used to determine each leaf region in the division tree, which represents an ICU (in the 2D or 3D space or bounding box). As described herein, the ICUs can be configured such that for end-to-end media systems the ICUs support viewport dependent processing (including delivery and rendering). For example, the ICUs can be configured according to m46208, where a minimal number of ICUs can be spatially randomly accessible for covering a viewport that is potentially dynamically moving (e.g., for instance, controlled by the user on a viewing device or based on a recommendation from the editor).

The techniques described herein provide for carrying the point cloud ICUs in associated, separate tracks. In some embodiments, the ICUs and division trees can be carried and/or encapsulated in respective sub-volumetric and sub-picture tracks and track groups. The spatial relationship and sample groups of the sub-volumetric and sub-picture tracks and track groups can be signaled in, for example, ISOBMFF as described in ISO/IEC 14496-12.

Some embodiments can leverage, for the 2D case, the generic sub-picture track grouping extensions with the track grouping type '2dcc' as provided in OMAF, e.g., as provided in Section 7.1.11 of the working draft of OMAF, 2nd Edition, N18227, entitled "WD 4 of ISO/IEC 23090-2 OMAF 2nd edition," Marrakech, MA (January 2019). Some embodiments can update and extend, for the 3D case, the generic sub-volumetric track grouping extension with a new track grouping type '3dcc'. Such 3D and 2D track grouping mechanisms, can be used to group the example (leaf node) sub-volumetric tracks in the octree decomposition and sub-picture tracks in the quadtree decomposition into three '3dcc' and '2dcc' track groups, respectively. For example, FIG. 6 shows three '3dcc' track groups 650, 652, and 654 of the sub-volumetric tracks (e.g., leaf tracks). As another example, FIG. 7 shows three '2dcc' track groups 750, 752 and 754 of the sub-picture tracks.

In some embodiments, the techniques described herein provide for grouping 2D point cloud data. For example, some embodiments provide grouping mechanisms, such as generic sub-picture track grouping extensions (e.g., as described in N18227), for 2D spatial relationships of divided 2D bounding boxes and/or ICUs.

According to some embodiments, grouping mechanisms can be provided and/or extended to indicate 2D spatial relationships. For example, the semantics of the track group type (e.g., "track_group_type") of the track reference metadata box (e.g., "TrackReferenceBox") can indicate the grouping type (e.g., "grouping_type"). The grouping type can be set to one of a set of values, a value registered, and/or a value from a derived specification or registration. The set of values can include, for example, 'msrc', 'ster', and '2dcc.' The value 'msrc' can indicate that this track belongs to a multi-source presentation (e.g., as specified in clause 8.3.4.3 of ISO/IEC 14496-12). The value 'ster' can indicate that this track is either the left or right view of a stereo pair suitable for playback on a stereoscopic display (e.g., as specified in clause 8.3.4.4.2 of ISO/IEC 14496-12). The value '2dcc' can indicate that this track belongs to a group of tracks with two dimensional spatial relationships (e.g. corresponding to spatial parts of a video source). The value '2dcc' can be specified in clause 7.1.11.2 in w18227, entitled "WD 4 of IS O/IEC 23090-2 OMAF 2nd edition", Marrakech, MA (January 2019), which is hereby incorporated by reference herein in its entirety.

In some embodiments, one or more values can identify a track group within a file. For example, in some embodiments the pair of the track group ID (e.g., "track_group_id") and track group type (e.g., "track_group_type") can identify a track group within the file. The tracks that contain a particular TrackGroupTypeBox having the same value of track_group_id and track_group_type can therefore belong to the same track group.

Figure 8:
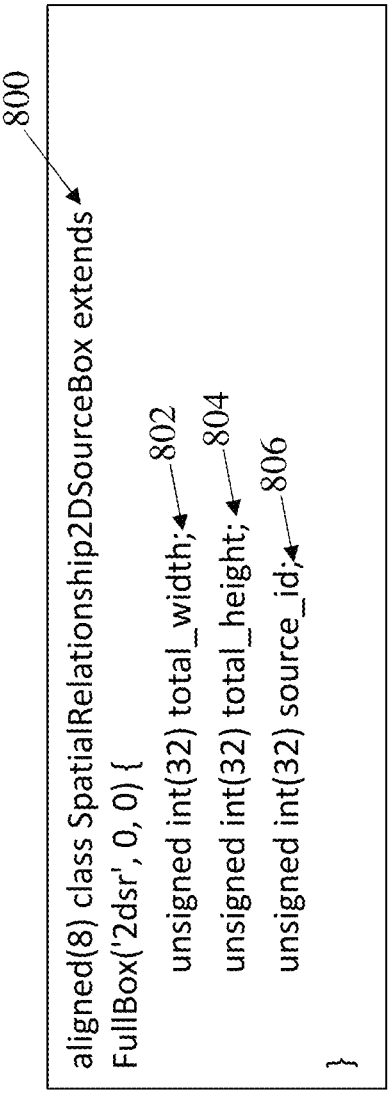
FIG. 8 shows an exemplary syntax of metadata specifying a 2D spatial relationship source, according to some embodiments.

Some embodiments provide for specifying 2D spatial relationship information. In some embodiments, metadata can specify, for a source, dimensional information (e.g., width, height) and an identifier, such as for each of the regions or sub-regions. FIG. 8 shows an exemplary syntax of metadata specifying a 2D spatial relationship source, according to some embodiments. FIG. 8 shows an exemplary syntax for the spatial relationship 2D source box class "SpatialRelationship2DSourceBox" 800 that extends a FullBox ('2dsr', 0, 0). The class 800 includes three unsigned 32 bit integers for total width "total_width" 802, total height "total_height" 804, and source ID "source_id" 806. The total_width field 802 can specify, in pixel units, the maximum width in the coordinate system of the SpatialRelationship2DDescriptionBox track group. The value of total_width 802 can be the same in all instances of SpatialRelationship2DDescriptionBox with the same value of track_group_id. The total_height field 804 can specify, in pixel units, the maximum height in the coordinate system of the SpatialRelationship2DDescriptionBox track group. The value of total_height 804 can be the same in all instances of SpatialRelationship2DDescriptionBox with the same value of track_group_id. The source_id parameter 806 can provide a unique identifier for the source. The source_id 806 can (e.g., implicitly) provide a coordinate system associated to this source. It should be appreciated that while the exemplary syntaxes described herein include exemplary fields and field names (e.g., SpatialRelationship2DSourceBox, total_width, etc. in the example of FIG. 8), these names are for exemplary purposes and are not intended to be limiting. It should be appreciated that other fields and/or naming conventions can be used without departing from the spirit of the techniques described herein.

FIG. 9 shows an exemplary syntax for metadata for a sub picture region, according to some embodiments. FIG. 9 shows an exemplary syntax for the sub picture region class "SubPictureRegionBox" 900 that extends FullBox ('sprg', 0,0). The class 900 includes four unsigned 16 bit integers object x "object_x" 902, object y "object_y" 904, object width "object_width" 906, and object height "object_height" 908. The semantics of object_x 902, object_y 904, object_width 906, and object_height 907 can be specified in, for example, clause 7.1.11.3.3 of in w18227.

The class 900 also includes two unsigned one bit integers "track_not_alone_flag" 910 and "track_not_mergable_flag" 912. A track_not_alone_flag 910 equal to 1 can indicate that the current sub-picture track is not intended to be presented alone without at least one other sub-picture track belonging to the same track group (e.g., of grouping type '2dcc'). A track_not_alone_flag 910 equal to 0 can indicate that the current sub-picture track may or may not be intended to be presented alone without at least one other sub-picture track belonging to the same track group (e.g., of grouping type '2dcc'). As described herein, it should be appreciated that the exemplary syntaxes and naming conventions provided herein are for exemplary purposes and are not intended to be limiting. For example, the track_not_alone_flag 910 can instead be part of the spatial relationship 2D source metadata discussed in conjunction with FIG. 8 (e.g., if the information is static, it should be included both for track grouping and sample grouping, and/or the like).

A track_not_mergable_flag 912 equal to 1 can indicate that the video bitstream carried in the current sub-picture track cannot be merged with the video bitstream carried in any other sub-picture tracks that belong to the same track group (e.g., of grouping type '2dcc') to generate a single video bitstream without a decoding mismatch by rewriting only header data of the bitstreams. In some examples, a decoding mismatch can refer to the value of one or more pixels (or any pixel) when decoding the video bitstream in the current track is not identical to the value of the same one or more pixels when decoding the merged single video bitstream. An example of such bitstream merging is the reconstruction of an HEVC bitstream as specified in clause 10.1.3.4 in w18227, when the untransformed sample entry type of the track with the given track_ID is equal to 'hvc2'. In some examples, a track_not_mergable_flag 912 equal to 0 can indicate that the video bitstream carried in the current sub-picture track can be merged with the video bitstream carried in at least one other sub-picture track belonging to the same track group (e.g., of grouping type '2dcc') to generate such a single video bitstream as described herein.

In some embodiments, the track_not_mergable_flag 912 can provide information for associated video codecs. For example, when HEVC (e.g., as specified by Rec. ITU-T H.265 and/or ISO/IEC 23008-2) is the video codec used for encoding the bitstreams carried in the sub-picture tracks, a track_not_mergable_flag 912 equal to 0 can mean that the HEVC bitstream carried in the current sub-picture track contains (e.g., and only contains) one or more MCTSs that can be indicated by a temporal MCTSs SEI message. In some examples, the temporal MCTSs SEI message can be that as specified in HEVC version 5 published by the ITU-T in February 2018 and/or a later version of HEVC.

Figure 10:
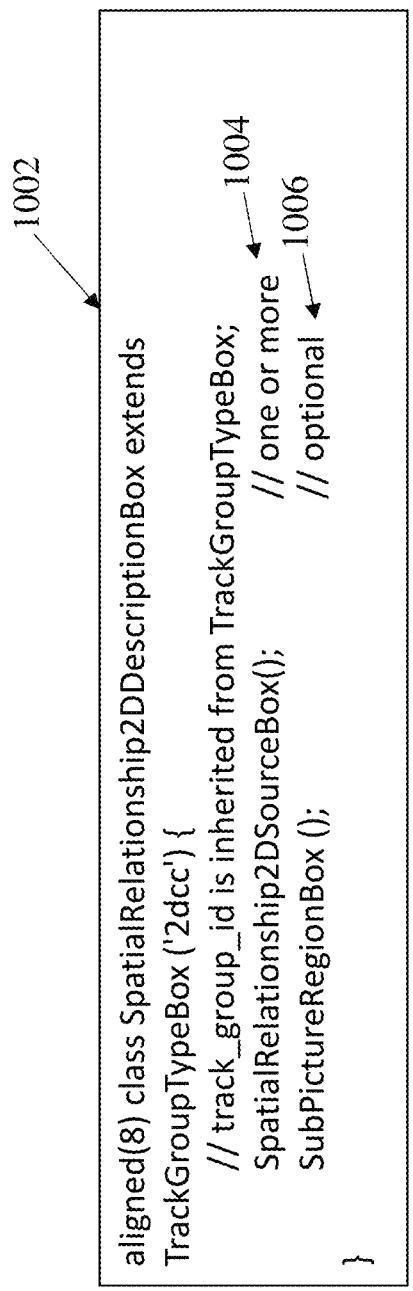
FIG. 10 shows an exemplary syntax for metadata for a spatial relationship 2D description, according to some embodiments.

In some embodiments, a 2D track group can identify both the source and the sub picture region metadata. For example, such a 2D track group can be part of a track to indicate the source information and also the region information. FIG. 10 shows an exemplary syntax for metadata for a spatial relationship 2D description, according to some embodiments. FIG. 10 shows an exemplary syntax for the 2D spatial relationship description box "SpatialRelationship2DDescriptionBox" 1002 which extends the TrackGroupTypeBox ('2dcc'). In this example, the SpatialRelationship2DDescriptionBox 1002 includes one or more SpatialRelationship2DSource boxes (e.g., including some and/or all of the information discussed in conjunction with FIG. 8). The SpatialRelationship2DDescriptionBox 1002 can optionally include a SubPictureRegionBox (e.g., including some and/or all of the information discussed in conjunction with FIG. 9).

The SpatialRelationship2DDescriptionBox 1002 can indicate that the track belongs to a group of tracks with 2D spatial relationships (e.g., corresponding to planar spatial parts of a video source). A SpatialRelationship2DDescriptionBox TrackGroupTypeBox with a given track_group_id can (e.g., implicitly) specify a coordinate system with an arbitrary origin (e.g., (0, 0)) and a maximum size specified by total width (e.g., "total_width" from the spatial relationship 2D source metadata box) and a total height (e.g., "total_height" from the spatial relationship 2D source metadata box). The x-axis can be oriented from left to right and the y-axis from top to bottom. The tracks that have the same value of source_id within a SpatialRelationship2DDescriptionBox TrackGroupTypeBox can be mapped as being originated from the same source and their associated coordinate systems share the same origin (e.g., (0, 0)) and the orientation of their axes. For example, a very high resolution video could have been split into sub-picture tracks. Each sub-picture track then conveys its position and sizes in the source video.

Tracks in the same track group can be constrained to declare common values, such as the same source_id, total_width, and/or total_height. Track groups with different values, such as different track_group_id values and the same source_id can represent the same source content, possibly at different resolutions (e.g., with different values of total_width or total_height).

In some embodiments, a source can be represented by different such track groups. For example, a source can be represented by different track groups when the same source is available at different resolutions. Each of these track groups can be identified by its own track group identifier track_group_id. Since all of these track groups originate from the same source, they share the same source_id.

In some embodiments, the semantics of the fields in the SubPictureRegionBox are described in the SpatialRelationship2DGroupEntry (e.g., see clause 10.9 of w18227). As described herein, the SubPictureRegionBox is optional. The SubPictureRegionBox can be either (a) present in the SpatialRelationship2DDescriptionBox with no associated SpatialRelationship2DGroupEntry in the associated track (e.g., such a track has a constant, static, size and position); or (b) not present in the SpatialRelationship2DDescriptionBox with one or more associated SpatialRelationship2DGroupEntry(s) in the associated track (e.g., this track possibly has a dynamic size and/or position).

When constructing the composition picture (e.g., as specified in clause 7.1.11.3.1 of w18227), gaps and/or overlaps may be allowed or not allowed. For example, gaps between sub-pictures carried in different sub-picture tracks are allowed, and overlaps between sub-pictures carried in different sub-picture tracks with different values of the layer field in TrackHeaderBox are allowed. As another example, overlaps between sub-pictures carried in different sub-picture tracks with the same value of the layer field in TrackHeaderBox can be disallowed.

In some embodiments, the spatial relationship can be restricted according to the chroma sub-sampling format of the associated track. For example, metadata such as total_width and total_height, object_x, object_y, object_width and/or object_height, can all select an integer number of samples for all planes. For example, when the format is 4:4:4, there can be no restriction on the metadata. As another example, when the format is 4:2:2, the total_width, object_x and object_width can be even numbers. As a further example, when the format is 4:2:0 all of the metadata fields can be even numbers.

FIG. 11 shows an example of a spatial relationship 2D group, according to some embodiments. FIG. 11 shows a SpatialRelationship2DGroupEntry 1102 that extends VisualSampleGroupEntry ('2dcc'). The '2dcc' grouping_type for the sample grouping can specify the positions and sizes of the samples from a sub-picture track in a spatial relationship track group. In some embodiments, a certain version (e.g., Version 1) of the SampleToGroupBox can be used when the grouping_type is equal to '2dcc'. In some embodiments, the value of the grouping_type_parameter can be equal to track_group_id of the corresponding spatial relationship track group.

In this example, the SpatialRelationship2DGroupEntry 1102 includes four sixteen bit unsigned integers object_x 1104, object_y 1106, object_width 1108 and object_height 1110. The object_x 1104 can specify the horizontal position of the top-left corner of the samples in this group within the coordinate system specified by the corresponding spatial relationship track group. In some examples, the position value can be the value prior to applying the implicit resampling caused by the track width and height, if any, in the range of 0 to total_width-1, inclusive, where total_width is included in the corresponding SpatialRelationship2DDescriptionBox. The object_y 1106 can specify the vertical position of the top-left corner of the samples in this group within the coordinate system specified by the corresponding spatial relationship track group. In some examples, the position value can be the value prior to applying the implicit resampling caused by the track width and height, if any, in the range of 0 to total_height-1, inclusive, where total_height is included in the corresponding SpatialRelationship2DDescriptionBox.

The object_width 1108 can specify the width of the samples in this group within the coordinate system specified by the corresponding spatial relationship track group. In some examples, the width value can be the value prior to applying the implicit resampling caused by the track width and height, if any, in the range of 1 to total_width, inclusive. The object_height 1110 can specify the height of the samples in this group within the coordinate system specified by the corresponding spatial relationship track group. In some examples, the height value is the value prior to applying the implicit resampling caused by the track width and height, if any, in the range of 1 to total_height, inclusive.

The composition picture can be reconstructed as based on the group information. For example, the composition picture can be reconstructed by, out of all of the tracks belonging to the same '2dcc' track group, the tracks can be formed into subgroups such that each subgroup contains tracks in the same alternate group. Once formed into subgroups, the device can then select exactly one track from each of those subgroups. For each composition-time aligned sample of each of the selected tracks, the following can apply, in the front-to-back ordering (layer) indicated in the TrackHeaderBox of the picked tracks: for each value of i in the range of 0 to object_width-1, inclusive, and for each value of j in the range of 0 to object_height-1, inclusive, the pixel value of the composition picture at pixel position ((i+object_x) % total_width, (j+object_y) % total_height) is set equal to the pixel value of the sample of this track at pixel position (i, j).

The techniques can incorporate one or more restrictions. For example, one or more restrictions can be placed on the presence of the sample grouping, on the values of the fields, and/or both. For example, restrictions can be those specified in clause 7.1.11.2.1 of w18227.

In some embodiments, the techniques described herein provide for specifying 3D spatial relationships. For example, the techniques can provide grouping mechanisms for grouping sub-volumetric tracks. In some embodiments, the techniques provide for generic sub-volumetric track grouping extensions for 3D spatial relationship of divided 3D bounding boxes, as described herein.

According to some embodiments, grouping mechanisms can be provided and/or extended to indicate 3D spatial relationships. For example, as described herein the semantics of the track group type (e.g., "track_group_type") can indicate the grouping type, which can be set to one of a set of values, a value registered, and/or a value from a derived specification or registration. The set of values can include '3dcc.' A value of '3dcc' can indicate that this track belongs to a group of tracks with three dimensional spatial relationships (e.g. corresponding to spatial parts of a video source) in the 3-dimensional Cartesian coordinates. In some embodiments, the 3-dimensional Cartesian coordinates can be specified in clause 5.1 of w18227.

Figure 12:
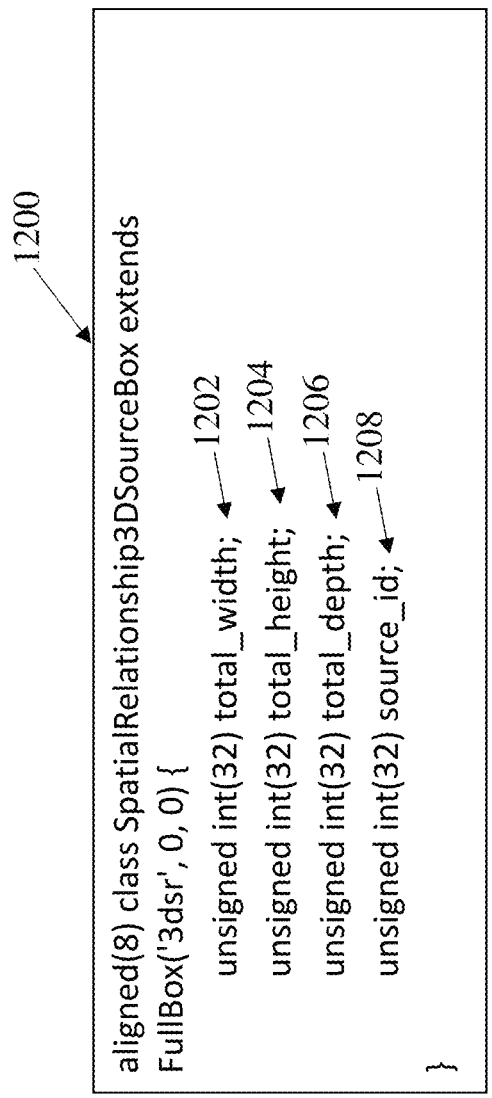
FIG. 12 shows an exemplary syntax of metadata specifying a 3D spatial relationship source, according to some embodiments.

Some embodiments provide for specifying 3D spatial relationships among sub-volumetric tracks. FIG. 12 shows an exemplary syntax of metadata specifying a 3D spatial relationship source, according to some embodiments. FIG. 12 shows an exemplary syntax for the spatial relationship 3D source box class "SpatialRelationship3DSourceBox" 1200 that extends a FullBox ('3dsr', 0, 0). The class 1200 includes four unsigned 32 bit integers for total width "total_width" 1202, total height "total_height" 1204, total depth "total_depth" 1206, and source ID "source_id" 1208. The total_width field 1202 can specify, in pixel units, the maximum width in the coordinate system of the SpatialRelationship3DDescriptionBox track group. The value of total_width 1202 can be the same in all instances of SpatialRelationship3DDescriptionBox with the same value of track_group_id. The total_height field 1204 can specify, in pixel units, the maximum height in the coordinate system of the SpatialRelationship2DDescriptionBox track group. The value of total_height 1204 can be the same in all instances of SpatialRelationship3DDescriptionBox with the same value of track_group_id. The total_depth field 1206 can specify, in pixel units, the maximum depth in the coordinate system of the SpatialRelationship3DDescriptionBox track group. The value of total_depth 1206 can be the same in all instances of SpatialRelationship3DDescriptionBox with the same value of track_group_id. The source_id parameter 1208 can provide a unique identifier for the source. The source_id 1208 can (e.g., implicitly) provide a coordinate system associated to this source.

FIG. 13 shows an exemplary syntax for metadata for a sub picture region, according to some embodiments. FIG. 13 shows an exemplary syntax for the sub volumetric region class "SubVolumetricRegionBox" 1300 that extends FullBox ('svrg',0,0). The class 1300 includes six unsigned 16 bit integers object x "object_x" 1302, object y "object_y" 1304, object z "object_z" 1306, object width "object_width" 1308, object height "object_height" 1310, and object depth "object_depth" 1312. The semantics of object_x 1302, object_y 1304, object_z 1306, object_width 1308, object_height 1310, and object_depth 1312 can be specified in, for example, the definition of SpatialRelationship3 DGroupEntry.

The class 1300 also includes two unsigned one bit integers "track_not_alone_flag" 1314 and "track_not_mergable_flag" 1316. A track_not_alone_flag 1314 equal to 1 can indicate that the current sub-volumetric track is not intended to be presented alone without at least one other sub-volumetric track belonging to the same track group (e.g., of grouping type '3dcc'). A track_not_alone_flag 1314 equal to 0 can indicate that the current sub-volumetric track may or may not be intended to be presented alone without at least one other sub-volumetric track belonging to the same track group (e.g., of grouping type '3dcc').

A track_not_mergable_flag 1316 equal to 1 can indicate that the video bitstream carried in the current sub-volumetric track cannot be merged with the video bitstream carried in any other sub-volumetric tracks that belong to the same track group (e.g., of grouping type '3dcc') to generate a single video bitstream without a decoding mismatch by rewriting only header data of the bitstreams. In some examples, a decoding mismatch can refer to the value of one or more pixels (or any pixel) when decoding the video bitstream in the current track is not identical to the value of the same one or more pixels when decoding the merged single video bitstream. An example of such bitstream merging is the reconstruction of an HEVC bitstream as specified in clause in clause 10.1.3.4 in w18227 when the untransformed sample entry type of the track with the given track_ID is equal to 'hvc2'. In some examples, a track_not_mergable_flag 1316 equal to 0 can indicate that the video bitstream carried in the current sub-volumetric track can be merged with the video bitstream carried in at least one other sub-volumetric track belonging to the same track group (e.g., of grouping type '3dcc') to generate such a single video bitstream as described herein.

In some embodiments, the track_not_mergable_flag 1316 can provide information for associated video codecs. For example, when HEVC (e.g., as specified by Rec. ITU-T H.265 and/or ISO/IEC 23008-2) is the video codec used for encoding the bitstreams carried in the sub-volumetric tracks, a track_not_mergable_flag 1316 equal to 0 can mean that the HEVC bitstream carried in the current sub-volumetric track contains (e.g., and only contains) one or more MCTSs that can be indicated by a temporal MCTSs SEI message. In some examples, the temporal MCTSs SEI message can be that as specified in HEVC version 5 published by the ITU-T in February 2018 and/or a later version of HEVC.

Figure 14:
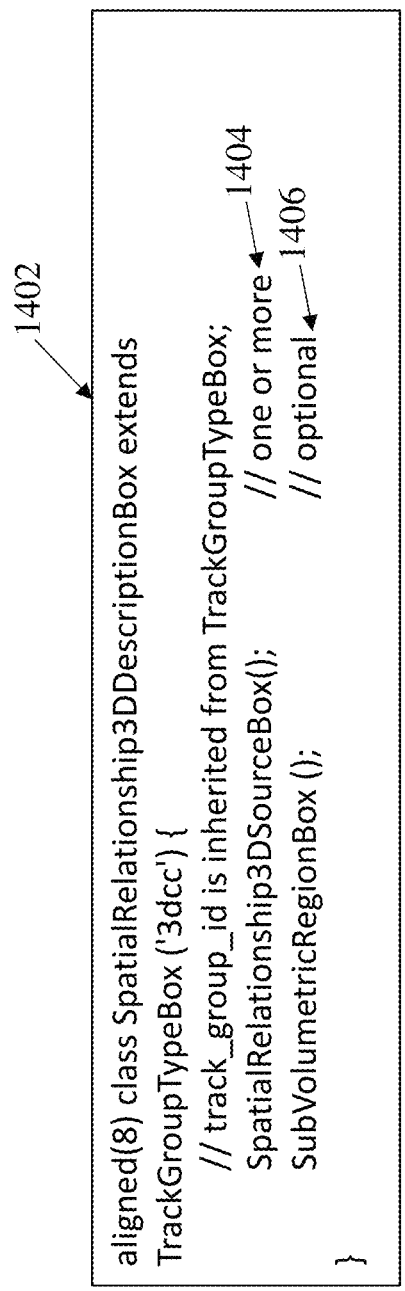
FIG. 14 shows an exemplary syntax for metadata for a spatial relationship 3D description, according to some embodiments.

FIG. 14 shows an exemplary syntax for metadata for a spatial relationship 3D description, according to some embodiments. FIG. 14 shows an exemplary syntax for the 3D spatial relationship description box "SpatialRelationship3DDescriptionBox" 1402 which extends the TrackGroupTypeBox ('3dcc'). In this example, the SpatialRelationship3DDescriptionBox 1402 includes one or more SpatialRelationship3DSource boxes 1404 (e.g., including some and/or all of the information discussed in conjunction with FIG. 12). The SpatialRelationship3DDescriptionBox 1402 can optionally include a SubVolumetricRegionBox 1406 (e.g., including some and/or all of the information discussed in conjunction with FIG. 13).

The SpatialRelationship3DDescriptionBox 1402 can indicate that the track belongs to a group of tracks with 3D spatial relationships (e.g., corresponding to volumetric spatial parts of a video source). A SpatialRelationship3DDescriptionBox TrackGroupTypeBox with a given track_group_id can (e.g., implicitly) specify a coordinate system with an arbitrary origin (e.g., (0, 0, 0)) and a maximum size specified by total width (e.g., "total_width" from the spatial relationship 3D source metadata box), total height (e.g., "total_height" from the spatial relationship 3D source metadata box), and total depth (e.g., "total_depth" from the spatial relationship 3D source metadata box). The x-axis can be oriented from left to right and the y-axis from bottom to top, and the z-axis from far to near. The tracks that have the same value of source_id within a SpatialRelationship3DDescriptionBox TrackGroupTypeBox can be mapped as being originated from the same source and their associated coordinate systems share the same origin (e.g., (0, 0, 0)) and the orientation of their axes. For example, a very high resolution video could have been split into sub-volumetric tracks. Each sub-volumetric track then conveys its position and sizes in the source video.

Tracks in the same track group can be constrained to declare common values, such as the same source_id, total_width, total_height, and/or total_depth. Track groups with different values, such as different track_group_id values and the same source_id can represent the same source content, possibly at different resolutions (e.g., with different values of total_width, total_height and/or total_depth).

In some embodiments, a source can be represented by different such track groups. For example, a source can be represented by different track groups when the same source is available at different resolutions. Each of these track groups can be identified by its own track group identifier track_group_id. Since all of these track groups originate from the same source, they share the same source_id.

In some embodiments, the semantics of the fields in the SubVolumetricRegionBox are described in the SpatialRelationship3DGroupEntry. As described herein, the SubVolumetricRegionBox is optional. The SubVolumetricRegionBox can be either (a) present in the SpatialRelationship3DDescriptionBox with no associated SpatialRelationship3DGroupEntry in the associated track (e.g., such a track has a constant, static, size and position); or (b) not present in the SpatialRelationship3DDescriptionBox with one or more associated SpatialRelationship3DGroupEntry(s) in the associated track (e.g., this track possibly has a dynamic size and/or position).

When constructing the composition volumetric region, gaps and/or overlaps may be allowed or not allowed. For example, gaps between sub-volumetric regions carried in different sub-volumetric tracks are allowed, and overlaps between sub-volumetric tracks carried in different sub-volumetric tracks with different values of the layer field in TrackHeaderBox are allowed. As another example, overlaps between sub-volumetric regions carried in different sub-volumetric tracks with the same value of the layer field in TrackHeaderBox can be disallowed.

In some embodiments, the spatial relationship can be restricted according to the chroma sub-sampling format of the associated track. For example, metadata such as total_width, total_height, total depth, object_x, object_y, object_z, object_width, object_height, and/or object_depth, can all select an integer number of samples for all regions. For example, when the format is 4:4:4, there can be no restriction on the metadata. As another example, when the format is 4:2:2, the total_width, object_x and object_width can be even numbers. As a further example, when the format is 4:2:0 all of the metadata fields can be even numbers.

Figure 15:
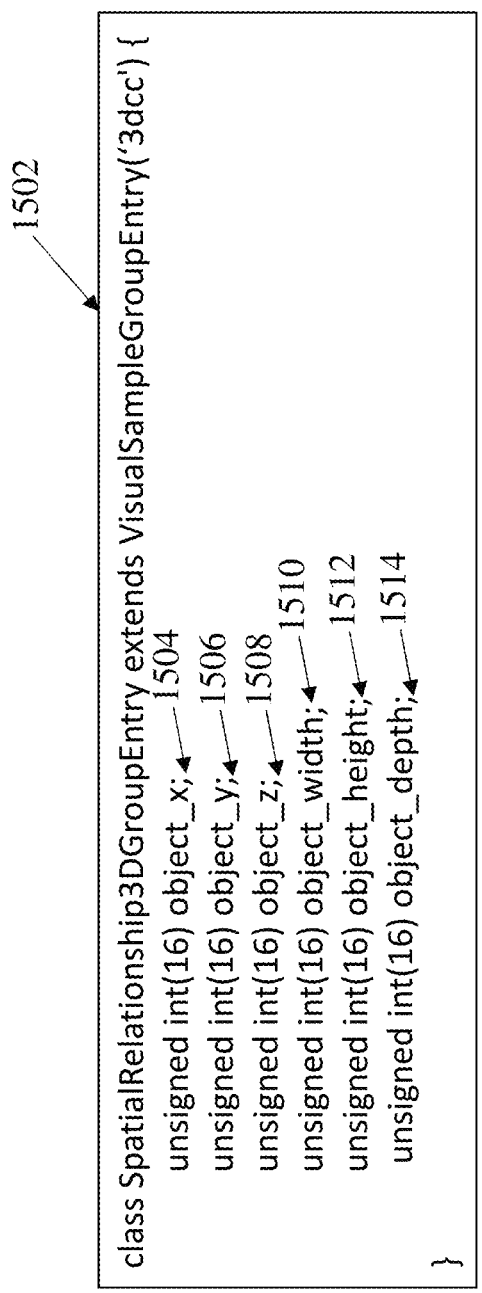
FIG. 15 shows an example of a spatial relationship 3D group, according to some embodiments.

FIG. 15 shows an example of a spatial relationship 3D group, according to some embodiments. FIG. 15 shows a SpatialRelationship3DGroupEntry 1502 that extends VisualSampleGroupEntry ('3dcc'). The '3dcc' grouping_type for the sample grouping can specify the positions and sizes of the samples from a sub-volumetric track in a spatial relationship track group. In some embodiments, a certain version (e.g., Version 1) of the SampleToGroupBox can be used when the grouping_type is equal to '3dcc'. In some embodiments, the value of the grouping_type_parameter can be equal to track_group_id of the corresponding spatial relationship track group.

In this example, the SpatialRelationship3DGroupEntry 1502 includes six sixteen bit unsigned integers object_x 1504, object_y 1506, object_z 1508, object_width 1510, object_height 1512, and object_depth 1514. The object_x 1504 can specify the horizontal position of the top-left corner of the samples in this group within the coordinate system specified by the corresponding spatial relationship track group. In some examples, the position value can be the value prior to applying the implicit resampling caused by the track width, height, and depth, if any, in the range of 0 to total_width-1, inclusive, where total_width is included in the corresponding SpatialRelationship3DDescriptionBox. The object_y 1106 can specify the vertical position of the top-left corner of the samples in this group within the coordinate system specified by the corresponding spatial relationship track group. In some examples, the position value can be the value prior to applying the implicit resampling caused by the track width, height, and depth, if any, in the range of 0 to total_height-1, inclusive, where total_height is included in the corresponding SpatialRelationship3DDescriptionBox. The object_z 1108 can specify the depth position of the top-left corner of the samples in this group within the coordinate system specified by the corresponding spatial relationship track group. In some examples, the position value can be the value prior to applying the implicit resampling caused by the track width, height and depth, if any, in the range of 0 to total_depth-1, inclusive, where total_depth is included in the corresponding SpatialRelationship3DDescriptionBox.

The object_width 1110 can specify the width of the samples in this group within the coordinate system specified by the corresponding spatial relationship track group. In some examples, the width value can be the value prior to applying the implicit resampling caused by the track width, height, and depth, if any, in the range of 1 to total_width, inclusive. The object_height 1112 can specify the height of the samples in this group within the coordinate system specified by the corresponding spatial relationship track group. In some examples, the height value is the value prior to applying the implicit resampling caused by the track width, height, and depth, if any, in the range of 1 to total_height, inclusive. The object_depth 1114 can specify the depth of the samples in this group within the coordinate system specified by the corresponding spatial relationship track group. In some examples, the depth value can be the value prior to applying the implicit resampling caused by the track width, height and depth, if any, in the range of 1 to total_depth, inclusive.

The composition volumetric region can be reconstructed as based on the group information. For example, the composition picture can be reconstructed by, out of all of the tracks belonging to the same '3dcc' track group, the tracks can be formed into subgroups such that each subgroup contains tracks in the same alternate group. Once formed into subgroups, the device can then select exactly one track from each of those subgroups. For each composition-time aligned sample of each of the selected tracks, the following can apply, in the front-to-back ordering (layer) indicated in the TrackHeaderBox of the picked tracks: for each value of i in the range of 0 to object_width-1, inclusive, for each value of j in the range of 0 to object_height-1, inclusive, and for each value of k in the range of 0 to object_depth-1, inclusive, the pixel value of the composition volumetric region at pixel position ((i+object_x) % total_width, (j+object_y) % total_height, (k+object_z) % total_depth) is set equal to the pixel value of the sample of this track at pixel position (i, j, k).

As described herein, the techniques can incorporate one or more restrictions. For example, one or more restrictions can be placed on the presence of the sample grouping, on the values of the fields, and/or both. For example, restrictions can be those specified in clause 7.1.11.2.1 of w18227.

Figure 16:
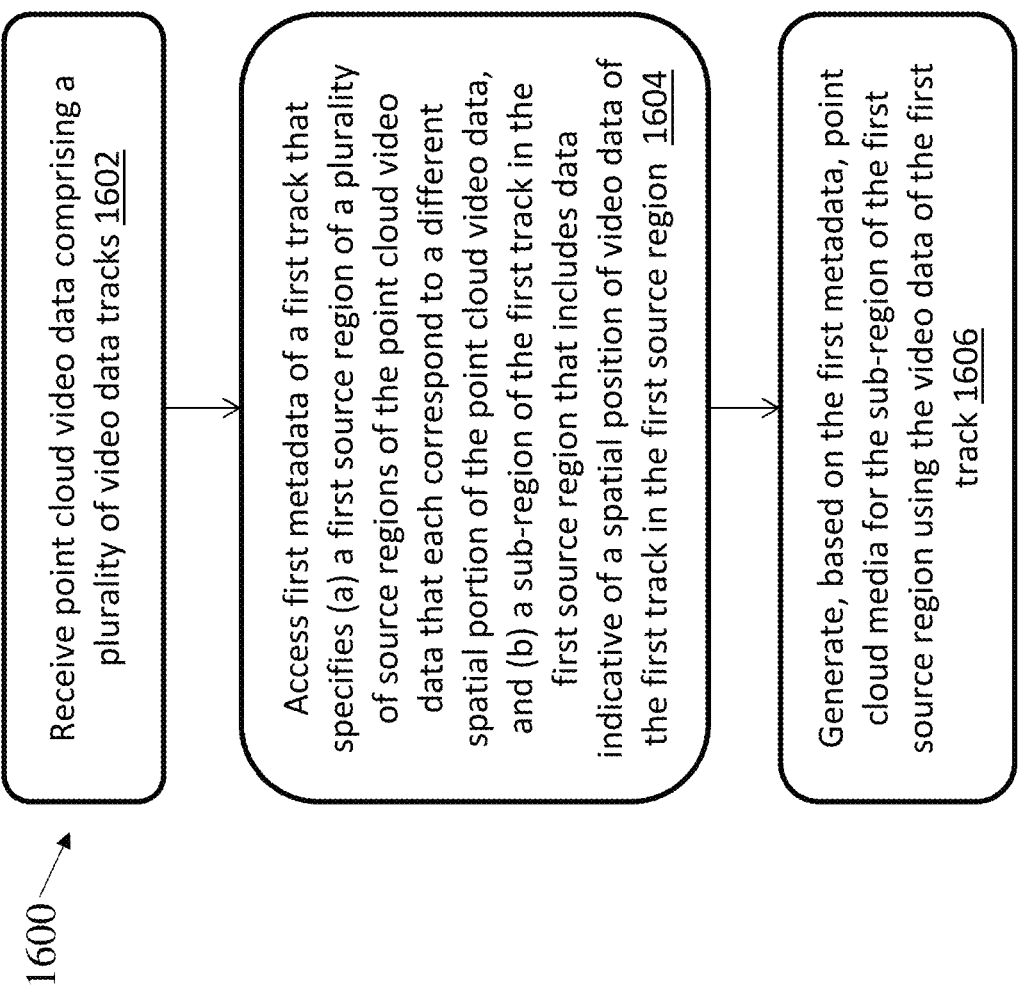
FIG. 16 shows an exemplary method of decoding point cloud video data, according to some embodiments.

As described herein, a composition picture can be reconstructed based on the group information. In some embodiments, the composition picture can be reconstructed by selecting tracks from sub-groups (e.g., each sub-group containing tracks in the same alternate group) formed based on all of the tracks belonging to the same track group (e.g., '2dcc' or '3dcc' track group). FIG. 16 shows an exemplary method 1600 of decoding point cloud video data, according to some embodiments. At step 1602, the device (e.g., the client device 302 in FIG. 3) receives point cloud video data (e.g., point cloud contents 304) that includes a plurality of tracks (e.g., a plurality of volumetric or sub-picture tracks). The method 1600 can generally be used to decode point cloud data stored in a format comprising a plurality of tracks (e.g., using the ISOBMFF track format).

At step 1604, the device accesses first metadata of a first track of the plurality of tracks. For example, the device can access metadata specifying a 2D/3D spatial relationship description, such as metadata discussed in conjunction with the SpatialRelationship2DDescriptionBox or the SpatialRelationship3DDescriptionBox examples described herein. The first metadata specifies a first source region of a plurality of source regions of the point cloud video data, wherein each source region corresponds to a different spatial portion of the point cloud video data.

Referring to steps 1602 and 1604, the point cloud content can be 2D or 3D content. For 2D for example, each track can be a two-dimensional (2D) sub-picture track, and the metadata can include 2D spatial relationship description metadata, the first source region can be a 2D source box, and the sub-region can be a sub-picture region for the first track. For 3D for example, each track can be a three-dimensional (3D) sub-volumetric track, and the metadata can include first 3D spatial relationship description metadata, the first source region can be a 3D source box, and the sub-region can be a sub-volumetric region for the first track.

Referring further to step 1604, the first source region can be specified, for example, using spatial relationship 2D or 3D source metadata, such as metadata discussed in conjunction with the SpatialRelationship2DSourceBox or SpatialRelationship3DSourceBox examples described herein. For example, the metadata specifying the first source region can include data indicative of a width of the source region, a height of the source region, a depth of the source region, or some combination thereof. The first metadata also specifies a sub-region of the first track in the first source region and includes data indicative of a spatial position of video data of the first track in the first source region. The sub-region can be specified, for example, using sub-picture or sub-volumetric region metadata, such as metadata discussed in conjunction with the SubPictureRegionBox and the SubVolumetricRegionBox examples described herein. For example, the metadata specifying the sub-region can include data indicative of a position of the sub-region in the first source region, a width of the sub-region, a height of the sub-region, a depth of the sub-region, or some combination thereof.

At step 1606, the device generates, based on the first metadata, point cloud media for the sub-region of the first source region using the video data of the first track. As described herein, the sub-region can include content from a plurality of regions. Therefore, the device can repeat the steps shown in FIG. 16, as necessary, to generate point cloud media for the sub-region of the first source region (as well as for other regions).

As discussed herein, the techniques can be similarly used to encode video content. The techniques can include encoding point cloud video data comprising encoding a plurality of tracks. A first source region of a plurality of source regions of the point cloud video data is determined, wherein each source region corresponds to a different spatial portion of the point cloud video data. A sub-region of the first track in the first source region is determined, comprising determining data indicative of a spatial position of video data in the first source region. The point cloud video data is encoded, based on the determined first source region and the determined sub-region of the first track, comprising encoding the video data in a first track, and encoding first metadata of the first rack comprising metadata specifying the first source region and the sub-region.

Various exemplary syntaxes and use cases are described herein, which are intended for illustrative purposes and not intended to be limiting. It should be appreciated that only a subset of these exemplary fields may be used for a particular region and/or other fields may be used, and the fields need not include the field names used for purposes of description herein. For example, the syntax may omit some fields and/or may not populate some fields (e.g., or populate such fields with a null value) depending on the type of ROI or viewport. As another example, other syntaxes and/or classes can be used without departing from the spirit of the techniques described herein.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:
1. A decoding method for decoding video data, the method comprising:
 receiving at least a portion of point cloud video data, comprising receiving:
  a plurality of groups of tracks that are separate from each other in carrying different bitstreams, wherein:

the point cloud video data is divided into a plurality of source regions, wherein:
each source region corresponds to a different spatial portion of the point cloud video data; and
at least one source region of the plurality of source regions is further divided into a plurality of sub-regions; and
each of the plurality of groups of tracks comprises video data of an associated portion of the point cloud video data;
each of the different bitstreams are received as separate point cloud content bitstreams that are not multiplexed into one point cloud content bitstream; and
spatial relationship metadata specifying, for each of the plurality of groups of tracks, which one of the plurality of source regions, and which one of the plurality of sub-regions, when applicable, the video data of the group of tracks is associated with;
accessing first metadata from the spatial relationship metadata of a first track of a first group of tracks of the plurality of groups of tracks, the first metadata specifying:
a first source region of the plurality of source regions of the point cloud video data, wherein the first source region comprises the plurality of sub-regions; and
a sub-region of the plurality of sub-regions the first track in the first source region comprising data indicative of a spatial position of video data of the first track in the first source region; and
generating, based on the first metadata, point cloud media for the sub-region of the first source region using the video data of the first track.

2. The method of claim 1, wherein the first metadata comprises first 2D spatial relationship description metadata, the first source region comprises a 2D source box, and the sub-region comprises a sub-picture region for the first track.

3. The method of claim 1, wherein:
the plurality of groups of tracks comprises a three-dimensional (3D) sub-volumetric track group comprising the first track; and
the first metadata comprises first 3D spatial relationship description metadata, the first source region comprises a 3D source box, and the sub-region comprises a sub-volumetric region for the first track.

4. The method of claim 3, wherein:
the 3D sub-volumetric track group further comprises:
at least one geometry track comprising geometry data;
at least one attribute track comprising attribute data; and
an occupancy track comprising occupancy map data; and
generating the point cloud media for the sub-region of the first source region comprises generating the point cloud media using the geometry data, the attribute data, and the occupancy map data.

5. The method of claim 1, further comprising:
accessing second metadata of a second track of the first group of tracks, the second metadata specifying:
the first source region; and
a second sub-region of the plurality of sub-regions of the second track in the first source region comprising data indicative of a spatial position of video data of the second track in the first source region; and
generating, based on the second metadata, point cloud media for the second sub-region of the first source region using the video data of the second track.

6. The method of claim 1, wherein metadata specifying the first source region comprises data indicative of a width of the first source region, a height of the first source region, a depth of the first source region, or some combination thereof.

7. The method of claim 1, wherein metadata specifying the sub-region comprises data indicative of:
a position of the sub-region in the first source region; and
a width of the sub-region, a height of the sub-region, a depth of the sub-region, or some combination thereof.

8. A method for encoding video data, the method comprising:
encoding at least a portion of point cloud video data comprising encoding:
a plurality of groups of tracks that are separate from each other in carrying different bitstreams, wherein:
the point cloud video data is divided into a plurality of source regions, wherein:
each source region corresponds to a different spatial portion of the point cloud video data; and
at least one source region of the plurality of source regions is further divided into a plurality of sub-regions; and
each of the plurality of groups of tracks comprises video data of an associated portion of the point cloud video data;
each of the different bitstreams are encoded as separate point cloud content bitstreams that are not multiplexed into one point cloud content bitstream; and
spatial relationship metadata specifying, for each of the plurality of groups of tracks, which one of the plurality of source regions, and which one of the plurality of sub-regions, when applicable, the video data of the group of tracks is associated with;
the encoding comprising:
determining a first source region of the plurality of source regions of a point cloud video data, wherein the first source region comprises the plurality of sub-regions; and
determining a sub-region of the plurality of sub-regions of the first track in the first source region, comprising determining data indicative of a spatial position of video data in the first source region; and
encoding, based on the determined first source region and the determined sub-region of the first track, the point cloud video data comprising:
encoding the video data in the first track, wherein the first track is of a first group of tracks of the plurality of groups of tracks; and
encoding first metadata of the spatial relationship metadata of the first rack comprising metadata specifying the first source region and the sub-region.

9. The method of claim 8, wherein the first metadata comprises first 2D spatial relationship description metadata, the first source region comprises a 2D source box, and the sub-region comprises a sub-picture region for the first track.

10. The method of claim 8, wherein:
the plurality of groups of tracks comprises a three-dimensional (3D) sub-volumetric track group comprising the first track; and
the first metadata comprises first 3D spatial relationship description metadata, the first source region comprises a 3D source box, and the sub-region comprises a sub-volumetric region for the first track.

11. The method of claim 10, wherein:
the 3D sub-volumetric track group further comprises:
- at least one geometry track comprising geometry data;
- at least one attribute track comprising attribute data; and
- an occupancy track comprising occupancy map data; and generating the point cloud video data for the sub-region of the first source region comprises generating the point cloud media using the geometry data, the attribute data, and the occupancy map data.

12. The method of claim 8, wherein metadata specifying the first source region comprises data indicative of a width of the first source region, a height of the first source region, a depth of the first source region, or some combination thereof.

13. The method of claim 8, wherein metadata specifying the sub-region comprises data indicative of:
- a position of the sub-region in the first source region; and
- a width of the sub-region, a height of the sub-region, a depth of the sub-region, or some combination thereof.

14. An apparatus configured to decode video data, the apparatus comprising a processor in communication with memory, the processor being configured to execute instructions stored in the memory that cause the processor to perform:
receiving at least a portion of point cloud video data, comprising receiving:
  a plurality of groups of tracks that are separate from each other in carrying different bitstreams, wherein:
    the point cloud video data is divided into a plurality of source regions, wherein:
      each source region corresponds to a different spatial portion of the point cloud video data; and
      at least one source region of the plurality of source regions is further divided into a plurality of sub-regions; and
    each of the plurality of groups of tracks comprises video data of an associated portion of the point cloud video data;
  each of the different bitstreams are received as separate point cloud content bitstreams that are not multiplexed into one point cloud content bitstream; and
  spatial relationship metadata specifying, for each of the plurality of groups of tracks, which one of the plurality of source regions, and which one of the plurality of sub-regions, when applicable, the video data of the group of tracks is associated with;
accessing first metadata from the spatial relationship metadata of a first track of a first group of tracks of the plurality of groups of tracks, the first metadata specifying:
  a first source region of the plurality of source regions of the point cloud video data, wherein the first source region comprises the plurality of sub-regions; and
  a sub-region of the plurality of sub-regions of the first track in the first source region comprising data indicative of a spatial position of video data of the first track in the first source region; and generating, based on the first metadata, point cloud media for the sub-region of the first source region using the video data of the first track.

15. The apparatus of claim 14, wherein the first metadata comprises first 2D spatial relationship description metadata, the first source region comprises a 2D source box, and the sub-region comprises a sub-picture region for the first track.

16. The apparatus of claim 14, wherein:
the plurality of groups of tracks comprises a three-dimensional (3D) sub-volumetric track group comprising the first track; and
the first metadata comprises first 3D spatial relationship description metadata, the first source region comprises a 3D source box, and the sub-region comprises a sub-volumetric region for the first track.

17. The apparatus of claim 16, wherein:
the 3D sub-volumetric track group further comprises:
- at least one geometry track comprising geometry data;
- at least one attribute track comprising attribute data; and
- an occupancy track comprising occupancy map data; and generating the point cloud media for the sub-region of the first source region comprises generating the point cloud media using the geometry data, the attribute data, and the occupancy map data.

18. The apparatus of claim 14, wherein the instructions further cause the processor to perform:
accessing second metadata of a second track of the first group of tracks, the second metadata specifying:
  the first source region; and
  a second sub-region of the plurality of sub-regions of the second track in the first source region comprising data indicative of a spatial position of video data of the second track in the first source region; and
generating, based on the second metadata, point cloud media for the second sub-region of the first source region using the video data of the second track.

19. The apparatus of claim 14, wherein metadata specifying the first source region comprises data indicative of a width of the first source region, a height of the first source region, a depth of the first source region, or some combination thereof.

20. The apparatus of claim 14, wherein metadata specifying the sub-region comprises data indicative of:
- a position of the sub-region in the first source region; and
- a width of the sub-region, a height of the sub-region, a depth of the sub-region, or some combination thereof.

21. The method of claim 1, wherein at least one of the plurality of groups of tracks only includes one track that comprises video data.

22. The method of claim 1, wherein each of the plurality of groups of tracks comprises video data of an associated spatial portion of the point cloud video data encoded into a bitstream of the different bitstreams, wherein:
the bitstream is separate from other bitstreams of the different bitstreams that each encode other spatial portions of the point cloud video data; and
the group of tracks comprises geometry data, attribute data, and occupancy map data for the associated spatial portion of the point cloud video data.

* * * * *